(12) United States Patent
Wang

(10) Patent No.: US 7,136,620 B2
(45) Date of Patent: Nov. 14, 2006

(54) METHOD AND APPARATUS FOR PROVIDING WIDEBAND SERVICES USING MEDIUM AND LOW EARTH ORBIT SATELLITES

(75) Inventor: Arthur W. Wang, Buena Park, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 373 days.

(21) Appl. No.: 10/718,024

(22) Filed: Nov. 19, 2003

(65) Prior Publication Data

US 2004/0110467 A1 Jun. 10, 2004

Related U.S. Application Data

(62) Division of application No. 09/346,444, filed on Jul. 1, 1999, now Pat. No. 6,678,520.

(60) Provisional application No. 60/115,285, filed on Jan. 7, 1999, provisional application No. 60/115,287, filed on Jan. 7, 1999.

(51) Int. Cl.
*H04B 7/185* (2006.01)
*H04Q 7/20* (2006.01)

(52) U.S. Cl. ............... 455/13.1; 455/428; 455/430; 455/452.1; 455/562.1

(58) Field of Classification Search ............ 455/12.1, 455/13.1, 427, 428, 429, 430, 450, 452.1, 455/561, 562.1, 3.01, 3.02
See application file for complete search history.

(56) References Cited

U.S. PATENT DOCUMENTS

| | | | |
|---|---|---|---|
| 5,206,658 A * | 4/1993 | Wokurka | 343/755 |
| 5,303,286 A * | 4/1994 | Wiedeman | 455/428 |
| 5,444,449 A | 8/1995 | Poskett et al. | |
| 5,555,257 A | 9/1996 | Dent | |
| 5,584,047 A | 12/1996 | Tuck | |
| 5,592,481 A | 1/1997 | Wiedeman et al. | |
| 5,594,941 A | 1/1997 | Dent | |
| 5,612,701 A * | 3/1997 | Diekelman | 342/354 |
| 5,678,174 A | 10/1997 | Tayloe | |
| 5,790,070 A * | 8/1998 | Natarajan et al. | 342/354 |
| 5,894,590 A | 4/1999 | Vatt et al. | |
| 5,946,603 A | 8/1999 | Ibanez-Meier et al. | |
| 5,949,766 A | 9/1999 | Ibanez-Meier et al. | |
| 5,974,317 A | 10/1999 | Djuknic et al. | |
| 6,019,318 A | 2/2000 | Cellier et al. | |

(Continued)

FOREIGN PATENT DOCUMENTS

DE 196 29 744 A1 2/1997

(Continued)

OTHER PUBLICATIONS

U.S. Appl. No. 09/594,375, filed Jun. 15, 2000, Donald C. D. Chang et al.

(Continued)

*Primary Examiner*—Quochien B. Vuong
(74) *Attorney, Agent, or Firm*—Georgann S. Grunebach

(57) ABSTRACT

A method and apparatus for mitigating communications interference between satellite communications systems in different orbits is disclosed. The method comprises the steps of evaluating a geometrical relationship between a second ground station and the satellites in the second satellite constellation, and directing communications between the second ground station and the second satellite according to the evaluated geometrical relationship. In one embodiment communications are handed over from a first satellite to another satellite when the first satellite is no longer at the highest elevation angle of visible satellites. In another embodiment, handover occurs when the first satellite drops below a minimum elevation angle.

5 Claims, 27 Drawing Sheets

U.S. PATENT DOCUMENTS

| | | | |
|---|---|---|---|
| 6,023,463 A | 2/2000 | Wiedeman et al. |
| 6,040,798 A | 3/2000 | Kinal et al. |
| 6,047,186 A | 4/2000 | Yu et al. |
| 6,061,562 A | 5/2000 | Martin et al. |
| 6,126,116 A | 10/2000 | Cellier |
| 6,138,012 A | 10/2000 | Krutz et al. |
| 6,151,308 A | 11/2000 | Ibanez-Meier et al. |
| 6,173,178 B1 | 1/2001 | Hammill et al. |
| 6,188,896 B1 | 2/2001 | Perahia et al. |
| 6,236,834 B1 | 5/2001 | Poskett et al. |
| 6,259,913 B1 * | 7/2001 | Noreils et al. | 455/450 |
| 6,324,398 B1 | 11/2001 | Lanzerotti et al. |
| 6,325,332 B1 | 12/2001 | Cellier et al. |
| 6,327,523 B1 | 12/2001 | Cellier |
| 6,333,924 B1 | 12/2001 | Porcelli et al. |
| 6,389,336 B1 | 5/2002 | Cellier |

FOREIGN PATENT DOCUMENTS

| | | |
|---|---|---|
| EP | 0 549 220 A2 | 6/1993 |
| EP | 0 748 062 A | 12/1996 |
| EP | 0 887 951 A | 12/1998 |
| JP | 59-97239 | 6/1984 |
| JP | 08-331030 | 12/1996 |
| WO | WO 90/13186 | 11/1990 |
| WO | WO 96/31016 | 10/1996 |
| WO | WO 99/13598 | 3/1999 |
| WO | WO 99/23769 | 5/1999 |
| WO | WO 01/97388 A3 | 12/2001 |
| WO | WO 01/97406 A3 | 12/2001 |

OTHER PUBLICATIONS

U.S. Appl. No. 09/594,374, filed Jun. 15, 2000, Donald C. D. Chang et al.

* cited by examiner

_US 7,136,620 B2_

METHOD AND APPARATUS FOR PROVIDING WIDEBAND SERVICES USING MEDIUM AND LOW EARTH ORBIT SATELLITES

CROSS-REFERENCE TO RELATED APPLICATIONS

This application is a divisional of application bearing Ser. No. 09/346,444 filed Jul. 1, 1999 now U.S. Pat. No. 6,678,520 which claimed benefit of U.S. Provisional Application No. 60/115,285, filed Jan. 7, 1999, by Arthur W. Wang and entitled "A SATELLITE SYSTEM FOR BROADBAND COMMUNICATIONS," and U.S. Provisional Application No. 60/115,287, filed on Jan. 7, 1999, by Arthur W. Wang and entitled "A GLOBAL BROADBAND SATELLITE SYSTEM". All three applications are hereby incorporated by reference herein.

BACKGROUND OF THE INVENTION

1. Field of the Invention

The present invention relates to systems and methods of designing, operating and maintaining satellite communication systems and in particular to a system and method for mitigating communications interference between satellite communications systems in different orbits.

2. Description of the Related Art

The need for worldwide communications communication is growing rapidly. This growth is propelled by the convergence of the telecommunications and computer industries, the rapid expansion of wireless technologies and the ever-expanding use of the Internet, which has made significant inroads into everyday life. The growth of small offices and home offices, the emergence of a mobile work force, and the development of multimedia applications have also contributed to the rapid growth of data related communications.

The emerging market for Internet/Intranet/Extranet connections requires a satellite system capable of providing short-delay, global-coverage, and high-bandwidth communication. The rapidly growing demand for Internet connections which require broadband data communication, known as access services (AS).

Internet service providers (ISPs) and related telecommunications providers are currently enhancing existing technologies and creating new infrastructures to support Internet services. Web access, electronic commerce, and remote access will soon be services available to everyone. Online data applications are rapidly going beyond basic email and file transfer functionality to encompass services such as videoconferencing, interactive multimedia collaborations and multicasting.

As Internet and multimedia applications increasingly drive the rapid growth of internetworking service markets, end-users of these services require that service providers transmit and process more data more rapidly.

Online user growth is skyrocketing as users discover the World Wide Web as a superior technology platform for delivering news, information, correspondence and entertainment. By the year 2000, the number of Internet users is expected to reach close to 300 million worldwide with more than four million business sites established on the Internet. Over 580 million computers in use by the year 2000, and total global IP services revenues are forecast to top $16 billion by 2002. Further, total online U.S. households are forecasted to reach 35 million by the year 2000.

Also fueling the demand for more bandwidth is e-commerce, which is growing at a remarkable rate. Increasingly, businesses realize that creating a business presence on the Internet allows them to reach more people economically. Consumers have embraced e-commerce due to its convenience and timesaving nature. As a result, e-commerce is expected to grow to $400 billion by the year 2002, accounting for approximately 8% of all retail purchases worldwide.

These millions of online transactions will require immediate connectivity solutions, especially in areas of the world where little or no Internet infrastructure is available creating a comprehensive terrestrial infrastructure will be too costly and time consuming. Moreover, intelligent agents that can facilitate user tasks (such as price comparisons) will further increase bandwidth needs.

Another development fueling the demand for bandwidth is Internet telephony service, a nascent market poised for dramatic growth. It has been forecasted that by 1999, Internet phone service worldwide will grow from virtually nothing to a $560 million business and, by 2001, packet-switched networks will account for about one percent of global long distance traffic—about 12.5 billion minutes worth.

From the foregoing, it can be seen that there is a need for a system providing high bandwidth data communication services. This need can be met with conventional terrestrial data communication systems; however, such systems are difficult and expensive to implement. The need can also be met with satellite systems in geosynchronous or geostationary (GSO) orbits, but the number of orbital slots is limited, and it is difficult devise earth stations of a reasonable power level and complexity that can communicate with such satellites.

There is therefore a need for a non-geostationary system NGSO provides high bandwidth communications. At the same time, communications with the NGSO system must not interfere with existing or future GSO systems. The present invention satisfies that need with a system constellation that meets a significant part of the enormous demand for bandwidth for global network interconnectivity.

SUMMARY OF THE INVENTION

To address the requirements described above, the present invention discloses a satellite communications system architecture providing high bandwidth service to a variety of widely-dispersed customers.

One aspect of the present invention is described in a satellite system deployed in a LEO, MEO, or combined LEO/MEO constellation, using narrow communication antenna beamwidths and intelligent handovers to mitigate interference with other satellites deployed in space. The satellite system provides a wide variety of two-way, broadband services to both business and residential customers.

The satellite system includes a plurality of satellites, for example, a constellation of seventy satellites and preferably includes radio communication links, intersatellite links, and telemetry, tracking, and command (TT&C) links. Through the use of spot beam and dual polarization technologies, each satellite can reuse the communication spectrum up to 30 times.

The present invention also uses spectrum sharing to avoid causing harmful interference with spacecraft in geostationary or geosynchronous (collectively referred to hereinafter as GSO) orbits. The satellite system provides broadband communications services to a wide range of users both in the United States and throughout the world and can efficiently use the Ku-band and enhance the capabilities of existing GSO satellite systems. The satellite system meets the needs of the emerging market of Internet/Intranet/Extranet connection by providing short delay, global coverage, and high bandwidth communication through a spectrum sharing-oriented system design, simple payload architecture, and small user terminals.

The satellite system meets a broad range of communications needs through services at various data rates, including data rates that range from 512 KBPS up to 10 MBPS. The satellite system further provides fast network connections for interactive broadband services to a wide range of customers, especially the personal or the small-office-home-office (SOHO) users. The satellite system implements an Internet-access service to serve the rapidly growing demand for Internet connections. An Intranet-access service also provides broadband connections from remote business sites to the center of a corporate wide area network (WAN). Finally, the present invention also provides an Extranet access service to extend the Intranet connection to remote locations for multi-national corporations especially for those business site in remote/rural areas and in developing countries.

The satellite system constellation design provides global coverage while fully protecting GSO satellite systems from unwanted interference. The system design allows resources to be focused on high demand areas, such as the continental United States (CONUS) and Europe, while providing significant service to lower-demand areas.

With its global coverage over under-served parts of the globe, the present system enables people everywhere access to the advantages of e-commerce. The satellite system's low latency will facilitate access to interactive Internet protocol (IP) communication and voice services.

The satellite communication system can provide communications capabilities that advances the National Information Infrastructure (NII) and Global Information Infrastructure (GII) by increasing the amount and variety of high-data-rate broadband interactive services throughout the world; multi-rate, multi-functional telecommunications services in general and high speed data access to the Internet in particular. The design of the system ensures that this capability can be provided at low cost with a short deployment time.

This is especially important due to a large increase in data traffic created by Internet use, which has highlighted the need for the deployment of alternative paths for data traffic. The present invention provides a data infrastructure that complements and interfaces with existing networks to support a wide range of communications services.

With its high data rate telecommunications capability, the present invention supports commercial communications including high-speed information transfers and interactive multimedia exchanges between businesses and customers, thereby creating new efficiencies and productivity for businesses that need to be connected to international networks. The present invention also allows developing countries will be able to use capacity of the communications satellite system to improve their own national telecommunications infrastructures without incurring the high cost and suffering the delay of installing towers, laying cable, and building terrestrial network facilities in all areas.

The present invention also enables users to readily update and retrieve applications, create secure IP-multicast sessions, and conduct high-speed file transfers; support media streaming; participate in interactive distance learning; and perform database updates and replication to and from personal computers (PCs). The satellite communications system provides Internet access to personal and small/home office users (SOHO) and Intranet/Extranet access to all businesses. It also enables related services such as IP telephony and e-commerce.

The satellite system design supports efficient, cost-effective provision of services. This is accomplished in part by the use of a spot beam technology that increases the efficiency with which spectrum is reused. This allows the present invention to provide more capacity for populated areas of the world. The characteristics of the system are ideal for supporting highly interactive broadband services. The present system will help build a broadband access infrastructure to meet all these requirements for ready access to more bandwidth.

The satellite communications system is designed to serve the global broadband market by providing interactive services to the mass market and applications such as high-speed Internet access, IP telephony and e-commerce.

In accordance with the foregoing, the invention is also described by a method for defining the communications satellite system. The method comprises the steps of identifying a plurality of communication interference scenarios; categorizing an interference requirement specifying a maximum interfering signal strength statistic at each of the second satellites according to a frequency of occurrence; identifying at least one interference mitigation strategy for each scenario and each category of interference requirement; determining the effectiveness of each identified interference mitigation strategy in mitigating interference for each of the scenarios and categories of interference requirement; and selecting at least one of the identified mitigation means for the first satellite communication system according to the determined effectiveness of the interference mitigation strategy.

Yet another aspect of the invention is described by a method for mitigating communication interference between a first satellite communicating with a first ground station and a second satellite, wherein the second satellite is one of a plurality of satellites in a second satellite constellation. The method comprises the steps of evaluating a geometrical relationship between a second ground station and the satellites in the second satellite constellation, and directing communications between the second ground station and the second satellite according to the evaluated geometrical relationship.

Yet another aspect of the invention is embodied in a satellite constellation system comprising a means for performing the operations described above operations.

The invention achieves an overall optimization within technology limits, regulatory constraints, and market segment to provide broadband Internet Access for both residential and commercial users.

The invention also improves the spectrum sharing capability between geostationary orbit (GSO) and non-geostationary orbit (NGSO) satellite systems while providing protection to existing Ku-band satellite services. Areas considered that facilitate spectrum sharing include constellation architecture and spacecraft antenna, user terminal, payload architecture, and link budget design.

A constellation design is defined that provides non-uniform coverage correlated to the predicted market and globally distributed population while minimizing system investment (including the use of fewer satellites) while assuring that interference with existing GSO assets are minimized.

A link budget design is optimized under the constraints of supporting small-to-medium sized user terminals and medium rate data communications. The disclosed user terminals are less than one meter and the data rate is between 512 Kbps and 10 MBPS.

The invention applies direct radiated array antennas to achieve side lobe attenuation control while meeting the maximum effective power flux density (EPFD) requirement proposed by GSO satellite operators to avoid harmful interference to GSO links.

Resource management provides maximum capacity with minimal resources. A dynamic resource management engine is located at the network control center (NOC) to monitor the payload power level, spacecraft traffic demand, regional spectrum availability, and network statistics. It not only provides 100% communication connection but also adjusts system resources (such as power and spectrum utilization) based on an optimized resource assignment. As a result, the interference to incumbent space assets is minimized by reducing excessive effective isotropic radiated power (EIRP), and the spectrum efficiency is maximized.

The invention provides a phased service deployment. The selection of the constellation allows launching as few as 4 satellites to provide near global service. The present invention also discloses the augmentation of the satellite systems by the addition of MEO satellites to provide complete global connection with increased capacity based on technology maturity and service demand.

The system architecture of the present invention provides seven-beam cluster frequency reuse, allowing users to be connected to various networks, including Internet, Intranet, and Extranet, through local gateway stations (GS). Each GS serves adjacent areas within the seven-beam cluster and routes the traffic to appropriate terrestrial networks or another GS for communicating with the other system users through double hops. This allows subscribers to be connected everywhere around the globe.

Further features, aspects, and advantages of the present invention will become apparent from the drawings and description contained herein.

BRIEF DESCRIPTION OF THE DRAWINGS

Referring now to the drawings in which like reference numbers represent corresponding parts throughout.

DETAILED DESCRIPTION OF PREFERRED EMBODIMENT

Figure 1:
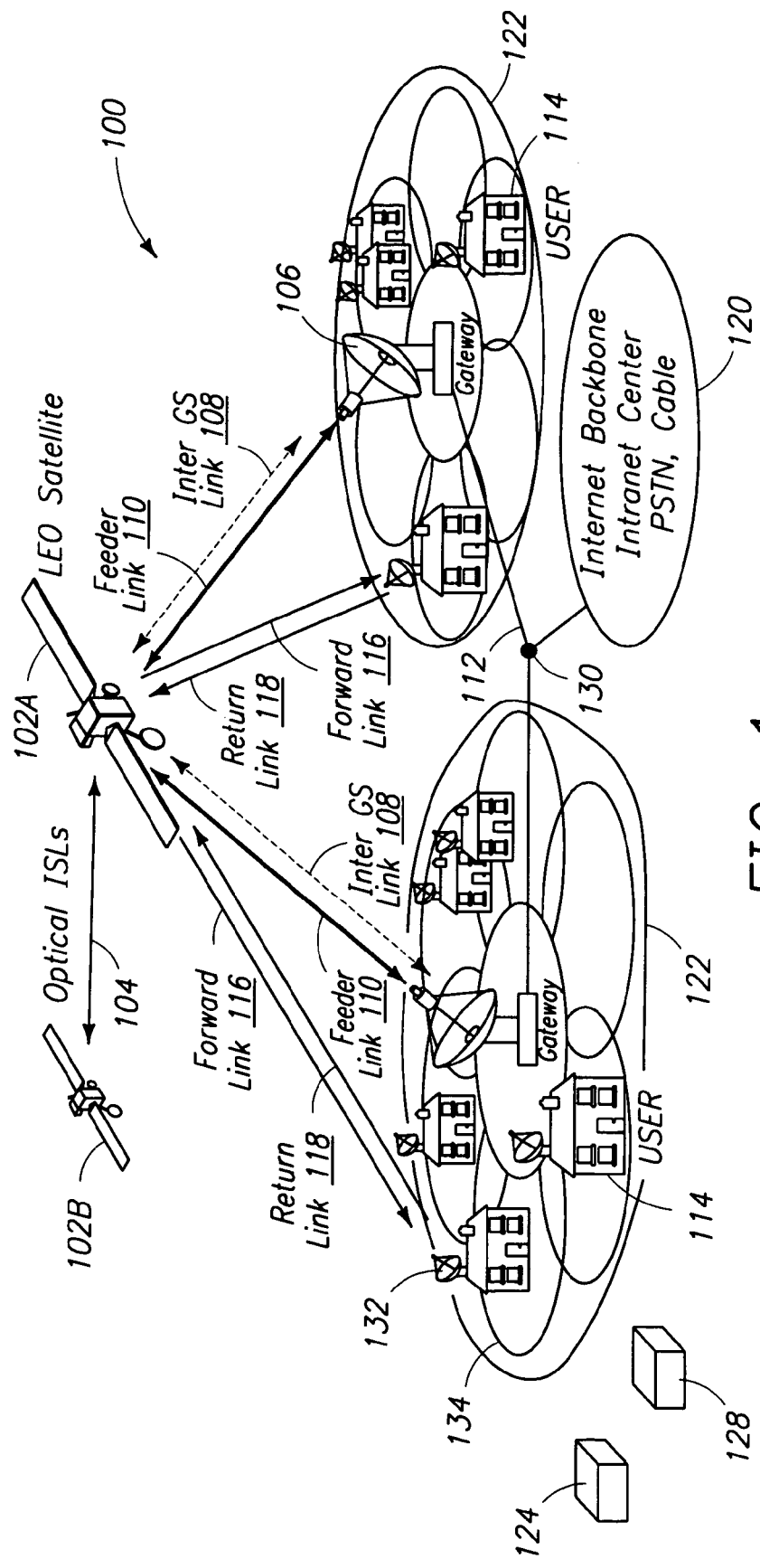
FIG. 1 is a diagram of an exemplary embodiment of the LEO SYSTEM.

In the following description, reference is made to the accompanying drawings which form a part hereof, and which is shown, by way of illustration, several embodiments of the present invention. It is understood that other embodiments may be utilized and structural changes may be made without departing from the scope of the present invention.

SUMMARY

The present invention is described by a communication system having a plurality of satellites in non-GSO (NGSO) orbits. In one embodiment of the invention, the satellite constellation comprises a plurality of satellites in a low earth orbit (LEO). This system is referred to herein as the "LEO SYSTEM". In another embodiment of the present invention, the LEO SYSTEM is augmented or supplanted by a constellation comprising a plurality of satellites disposed in a mid earth orbit (MEO). This system is referred to herein as the MEO SYSTEM 2100.

Both the LEO SYSTEM and MEO SYSTEM satellite networks include a plurality of satellites, each with at least one communication antenna for generating at least one beam cluster. The beam cluster includes a plurality (typically seven) proximally-disposed steerable communication beams. Each of the satellites also comprises a flexible channelizer for dynamically directing the communication beams according to user terminal service demands. Hence many overlapping beams can be directed to areas with many user terminals or terminals requiring high bandwidth services, while fewer beams can be directed to areas where there are fewer users or users with lower bandwidth requirements.

Users communicate with global communication services such as the Internet, Intranet, or a public switched telephone network (PSTN) via a plurality of gateway nodes. Each gateway node is associated with the user terminals serviced by a beam cluster. Hence, in the typical case, each cluster of seven (7) beams provides services to all of the user terminals within the beam footprint of the seven (7) beams, and each of these users is associated with a gateway node. The user terminal transmits requests for communication services to the satellite, which relays the request to the gateway. The gateway then forwards this request to the communication service. Similarly, messages from the communication service are received by the gateway, transmitted to one of the satellites in the network, and relayed to the user terminal. Hence, the gateway nodes relay messages to and from the communication service and the user, via the satellites in the satellite system.

The Leo System (100) Satellite System

The LEO SYSTEM 100 provides broadband communications services to customers within the United States and throughout the world at data rates from 512 Kbps up to 10 MBPS. Spot beam coverage from any LEO SYSTEM satellite can be reconfigured in orbit. Use of spot beams and dual polarization allows the Ku-band spectrum to be reused 30 times by each LEO SYSTEM satellite. The system has been designed to facilitate frequency sharing with other systems, both NGSO, and GSO.

FIG. 1 is a diagram of the LEO SYSTEM 100. The LEO SYSTEM 100 comprises a space segment having plurality of satellites 102 in a satellite constellation. In one embodiment, the LEO SYSTEM 100 includes a total of 70 satellites in circular orbit at altitude of approximately 1490 km in ten circular planes. Communication between one satellite (102A, for example) and another satellite in the LEO constellation (102B, for example) is via an optical inter-satellite link (ISL) 104.

The LEO SYSTEM 100 further comprises a ground segment which includes user terminals (UTs) 114, system access nodes 130, and network operation control centers (NOCs) 124, and satellite operations centers (SOCs) 128. The satellites 102 communicate with ground based user terminals (UTs) 114, gateways 106, and other satellites in the constellation.

In one embodiment, the LEO SYSTEM 100 uses one GHz of the bandwidth in the Ku spectrum within 10.7–12.7 GHz (Region 2) and 10.70–12.75 GHz (Regions 1 and 3) for space-to-Earth transmissions and one GHz of spectrum within 12.75–13.25 GHz and 13.75–14.5 GHz for Earth-to-space transmissions. Using the interference-mitigation techniques described herein, including the use of spot-beam technology, dual polarization, GSO keepout zones and special handover tracking methods, each satellite can reuse the spectrum up to 30 times. So configured, the LEO SYSTEM 100 provides high data rate Internet access from 512 Kbps up to 10 MBPS using Ku-band spectrum.

Each of the ground-based user terminals 114 includes at least one antenna, which may vary from 0.6 meters (24 inches) to 0.9 meters (36 inches) in diameter, but can be larger or smaller. Subscribers make data requests via satellite and receive downloads on demand through the a system gateway 106, or by direct satellite transmission to the UT 114.

In one embodiment, each gateway 106 communicatively connects beam cluster 122 having a plurality of (typically seven) neighboring or proximally disposed beams (shown by footprints 134) and is interconnected either through terrestrial communication link 112, inter-gateway links 108, or inter-satellite links 104. This high data rate service to small UTs 114 is possible because the system design employs highly directive spacecraft antenna beams as evidenced by beam footprints 134. These highly directive beams also serve to reduce interference. High spectrum reuse and large number of worldwide gateways 106 further enhance the overall system capacity.

The system network 120 connection is performed by both the ground gateway 106 and a switch on board the satellite 120. The gateway 106 provides routing information during the set-up period (when a data communication is initialized) and the on-board switch performs connections between user terminal 114 and its gateway 106, among gateways 106, and between a inter-satellite link (ISL) and a gateway 106.

The LEO SYSTEM 100 provides users with a transparent connection to a wide variety of terrestrial networks including the Internet, corporate intranets, WANs, local area networks (LANs), and autonomous transfer mode (ATM) networks.

The LEO SYSTEM 100 supports both packet-switched and circuit-switched operation. The decision to employ either packet switching or circuit switching is handled by the gateway 106. Information regarding this determination is then uploaded to the satellite 102 from the gateway 106 or NOC 124 to complete the remainder of the connection operations and to route packet-switched and circuit-switched data to proper destinations.

The NOC 124, which works with the satellite onboard processors in the satellites 102 to control user access requests. In addition, the NOC 124 monitors and controls service availability and capacity, beam management, and handovers throughout the LEO SYSTEM 100.

Frequency Plan

Figure 2:
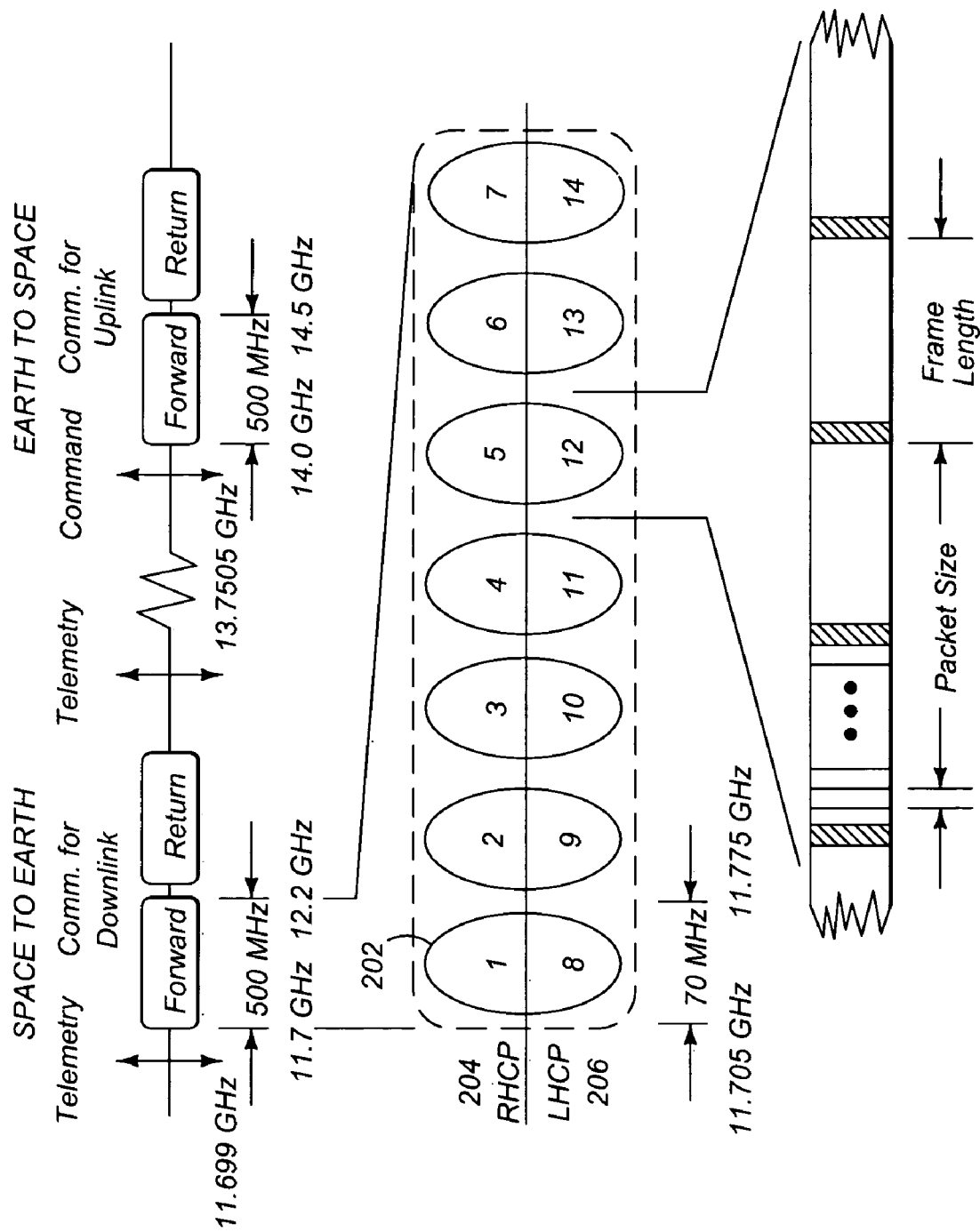
FIG. 2 is a diagram presenting an illustrative frequency plan for the LEO SYSTEM.

FIG. 2 is a diagram presenting an illustrative frequency allocation for the LEO SYSTEM 100. Total bandwidth in each region (Earth-to-space and space-to-Earth) can be selected according to system requirements. In one embodiment, a total of 1 GHz is used in each region. This 1 GHz spectrum is divided into two 500 MHz segments for communication links between (between the user terminals 114 and the satellites 102) and 500 MHz segments for the feeder links 110 (between the gateways 106 and the satellites 102), respectively. The communication link segment is then subdivided into seven 70 MHz sub-segments 202 and reused in each of two polarizations 204, 206 (right and left-hand circular).

Each of the satellites 102 includes at least one satellite antenna for communication purposes. The design of the satellite antenna maximizes spatial isolation among beams with the same frequency and polarization. This allows dense coverage for high demand areas because multiple 70 MHz-band segments can be deployed to maximize service capacity in the same geographic area defined by the associated beam footprints 134 from one satellite through dynamic resource management. One of several different beam laydown patterns can be chosen in a service area, depending on service requirements, including multiple overlapping beams where necessary.

In one embodiment, the LEO SYSTEM 100 uses a combination of frequency division multiple access (FDMA) and time division multiple access (TDMA) to provide flexible data rates. Each FDMA carrier is 70 MHz, which supports a total of 200 MBPS on two polarizations at 100 MBPS per polarization. In this embodiment, the maximum data rate for a UT 114 with a 60-centimeter antenna is approximately 10 MBPS, and the system can simultaneously support 2000 or more users at data rate of 10 MBPS. Lower data rates can be supported through the combination of narrower FDMA carrier (<70 MHz) or TDMA slots. For example, the lowest data rate users (about 512 Kbps) can be supported by dividing a 70 MHz carrier into 200 time slots. With small beamwidth footprints 134 and dual polarization, the spectrum can be reused as much as 30 times per satellite.

In another embodiment, the LEO SYSTEM 100 uses a code division multiple access (CDMA) modulation technique using pseudonormal (PN) codes. This embodiment has the same frequency sharing capability as the FDMA/TDMA embodiment described above.

Satellite Characteristics

Figure 3:
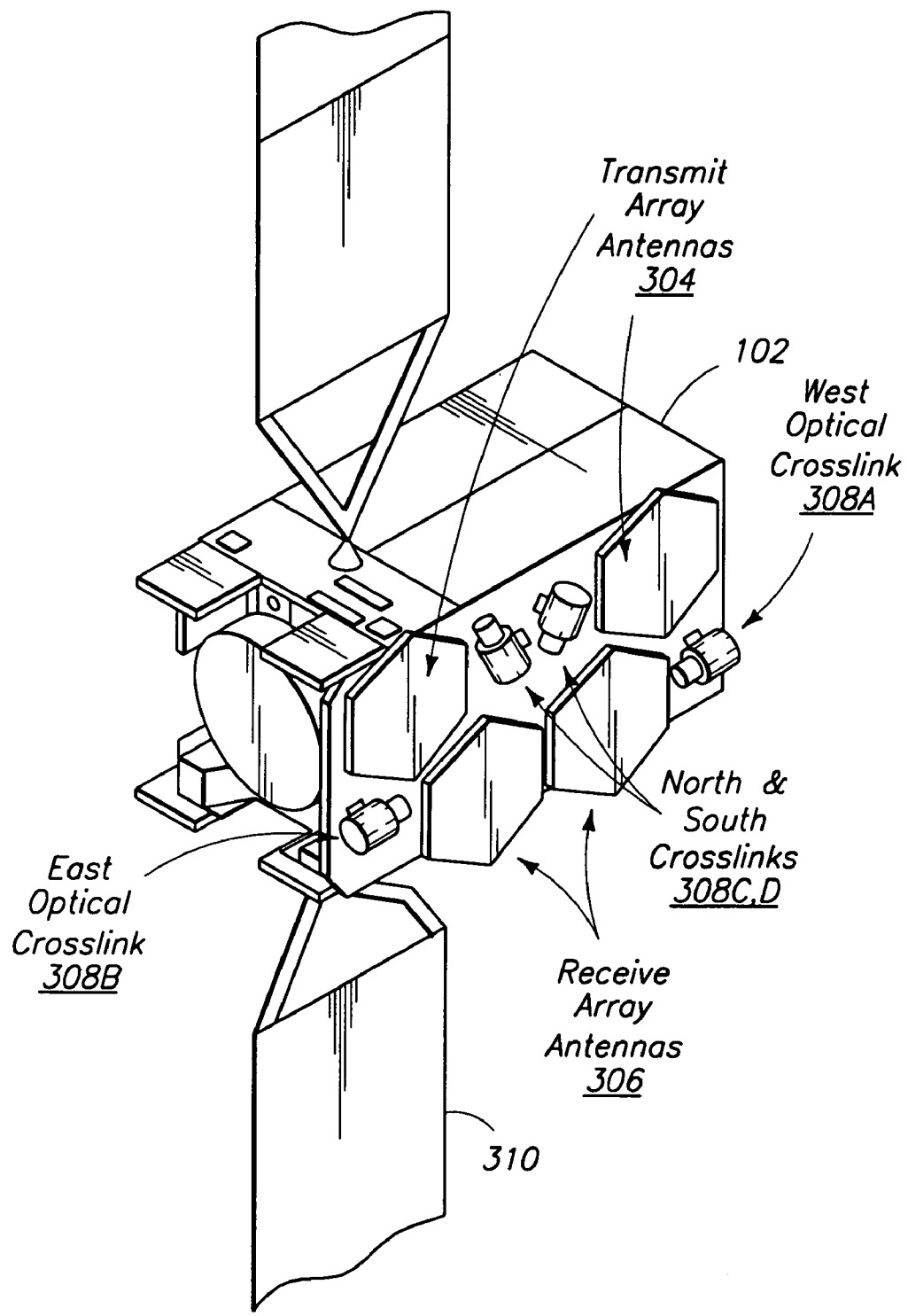
FIG. 3 is a diagram illustrating one embodiment of the LEO SYSTEM satellites.

FIG. 3 is a diagram presenting a physical depiction of one embodiment of the satellites 102. Table I provides a list of pertinent satellite characteristics.

TABLE I

LEO SYSTEM Satellite 102 Characteristics

| | |
|---|---|
| Satellite Bus | High Power Satellite Bus |
| Mission Life | 10 years |
| Stabilization | Body stabilized using reaction wheels |
| DC Power - Beginning of Life | 818 kW |
| DC Power - End of Life | 7.5 kW |
| Eclipse Capability | 100% |
| Deployed Length | Approximately 22 meters |
| Approximate Mass (Plan 1) | 2000 kg with propellant |
| | 1650 kg without propellant |
| Ku-band Antennas | 2 Ku-band transmit array antennas |
| | 2 Ku-band receive array antennas |
| TT&C Antennae | 2 Ku-band transmit/receive bicones |
| | 2 Ku-band transmit/receive pipe antennas |
| Antenna Pointing | Earth sensor, sun sensor, and gyros |
| Number of Beam Positions | 867 beam Positions (40 from LEO) |
| Number of Active Channels | 210 single polarization channels (beams) |
| Number of Command Carriers | 2 |
| Number of Telemetry Carriers | 2 |
| Number of Tracking Beacons | Telemetry signals also serve as Tracking beacon |
| Number of Laser Carriers, ISL | 4 |
| Ku-Band Spectrum Reuse | 30 times |
| Antenna Pointing Accuracy | 0.4 degrees N-S and E-W |
| Antenna Pointing Range | 54 degrees from nadir circular field-of-view |
| Antenna Beamwidth | 4 degrees |

Payload Architecture

The LEO SYSTEM 100 provides broadband data communications at rates up to 10 MBPS. Circuits can be symmetrical or asymmetrical and simplex or duplex. Payload management and reconfiguration is performed via an LEO SYSTEM ("LS") 100 TT&C subsystem operating in conjunction with the system's ground operations and control segment. Table II presents selected communication parameters.

TABLE II

Illustrative Communication Parameters

| Parameter Description | Ku-Band Payload | Crosslink Payload |
|---|---|---|
| Modulation Format | Offset QPSK (OQPSK) | Intensity, Wavelength Multiplexed |
| Coding Scheme | Convolutional Concatenated Reed Solomon | Convolutional Concatenated Reed Solomon |
| Bit Error Rate | $1 \times 10^{-9}$ | $1 \times 10^{-9}$ |
| Data Rate | E1/4 = 512 KPBS E1 = 2 MBPS virtual circuit switched | 3 GBPS |
| Total Bandwidth per Beam | 70 MHz | N/A |

Referring to FIG. 3, each satellite 102 comprises an antenna subsystem having direct radiating arrays, including one or more transmit array antennae 304 and one or more receive array antennae 306. The antennae 304, 306 utilize dual polarization with minimum of 20 dB of cross-polarization isolation, and are each capable of servicing 867 spot beam positions. Approximately 210 spot beams are activated per satellite 102, each utilizing 140 MHz of dual polarized transmit and receive frequency spectrum. The satellite 102 comprises a processor 738, which can also switch multiple sub-bands to a single beam if the demand is high in a specific beam. As each satellite 102 passes over a service area, it may direct its beams at specific locations.

Figure 4:
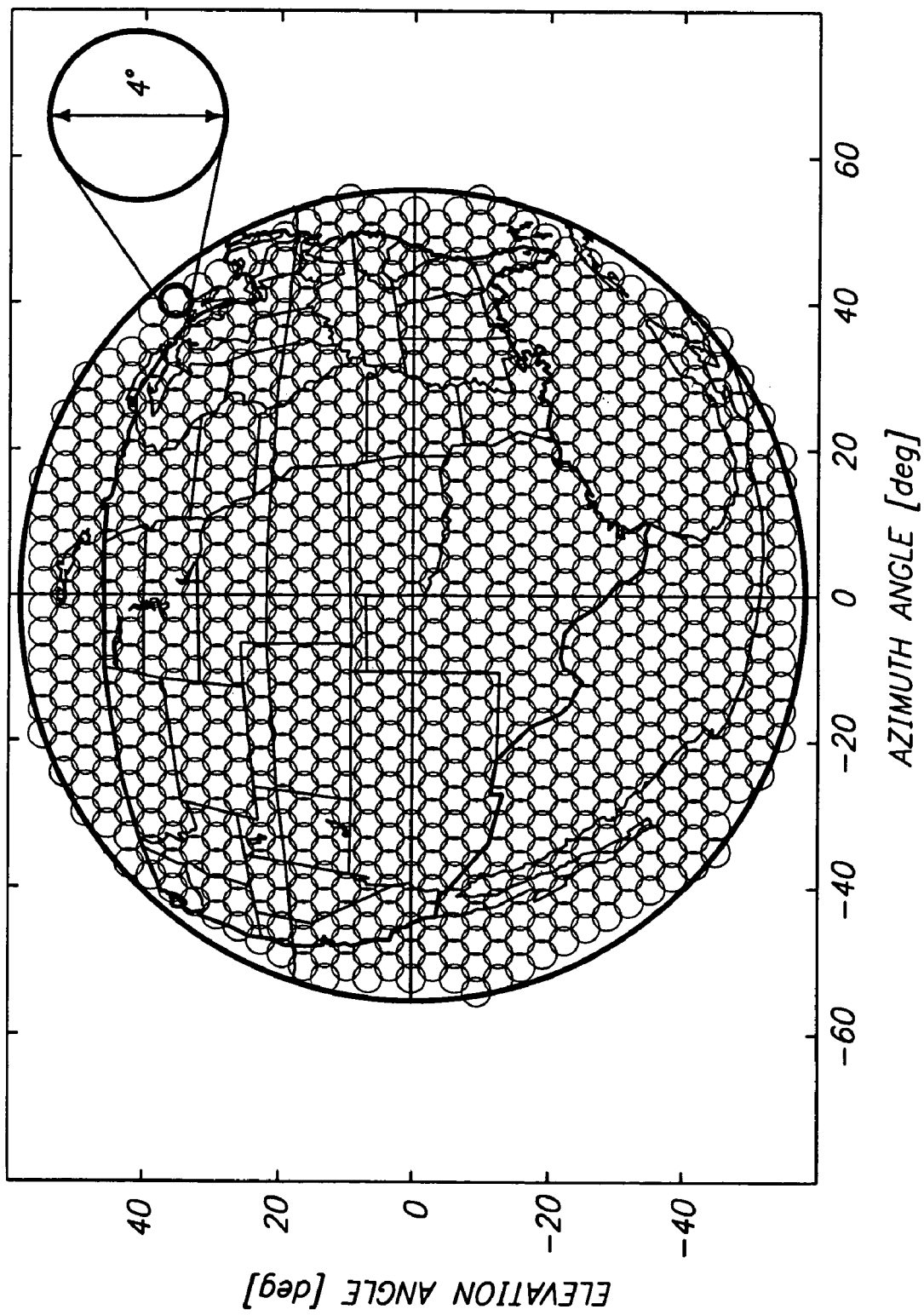
FIG. 4 is a plot showing antenna coverage for a representative spot beam of four degrees.

FIG. 4 is a plot showing antenna coverage for a representative spot beam of 4 degrees. As shown in FIG. 4, at any one time, up to 210 spot beams out of 867 beams per satellite 102 at 4 degrees will be illuminated. Handover procedures from beam-to-beam and from satellite-to-satellite are performed as described further below.

Figure 5:
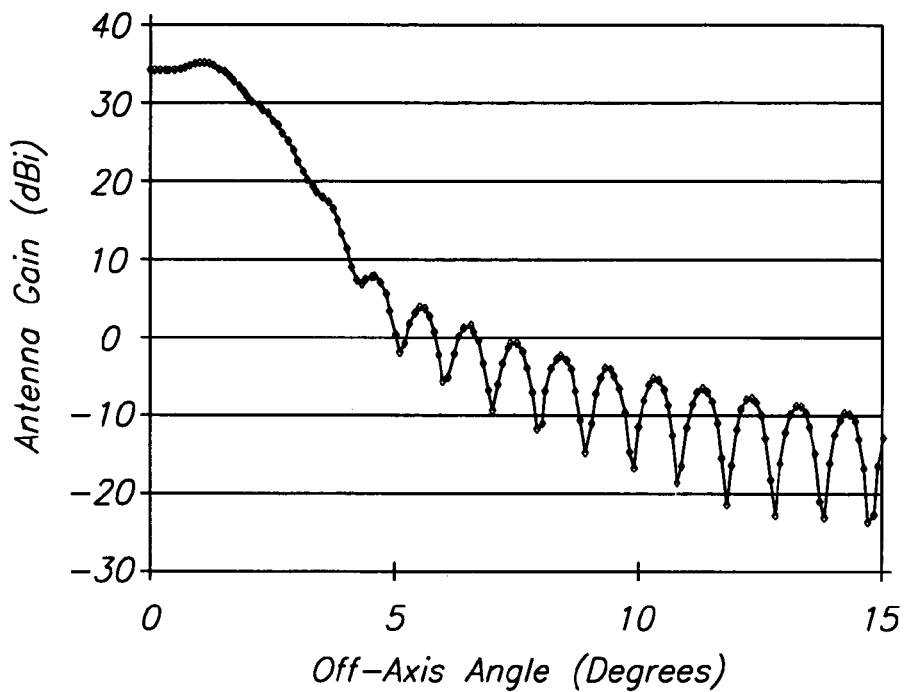
FIG. 5 is a diagram showing the transmit and receive sensitivity pattern for the phased array antennae.

FIG. 5 is a diagram showing the transmit and receive sensitivity pattern for the phased array antennae.

Figure 6:
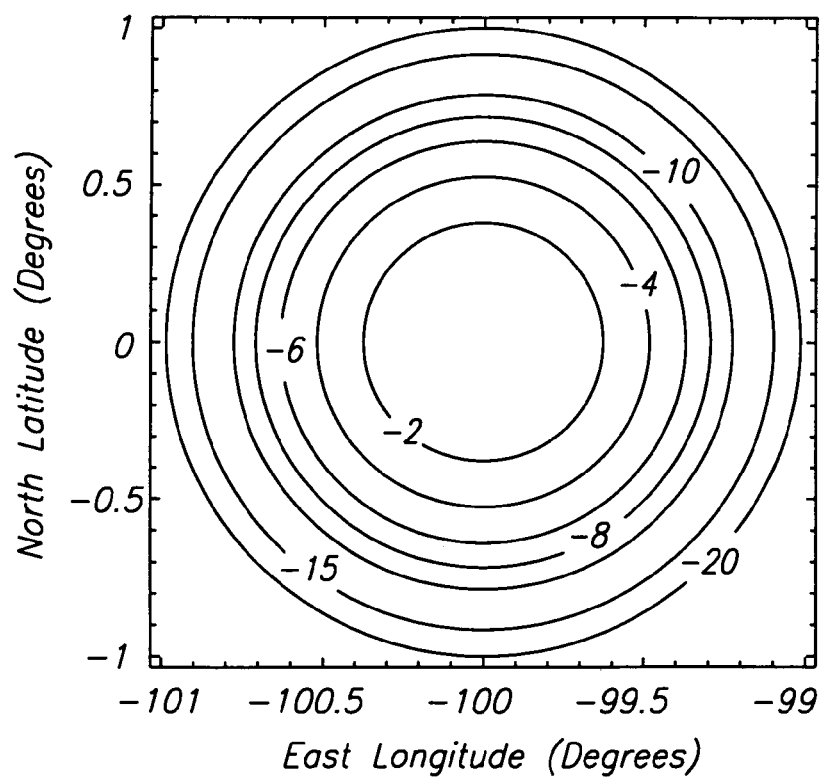
FIG. 6 is a diagram showing transmit/receive antenna contours for the phased array antennae.

FIG. 6 is a diagram showing transmit/receive antenna contours for LEO SYSTEM phased array antennae. The illustrated gain contours are −2, −4. −6, −8, −10, −15, and −20 dB as the outermost contour. The maximum gain, $G_{max}$, is reduced by a scan loss factor, $\Delta G_{scan}$, where the scan loss factor is a function of the scan angle from the antenna boresight.

Three classes of communication traffic are associated with the LEO SYSTEM 100. These classes include (1) communication links 116, 118, (2) inter-gateway links 108 and feeder links 110, and (3) inter-satellite links 104.

Figure 7:
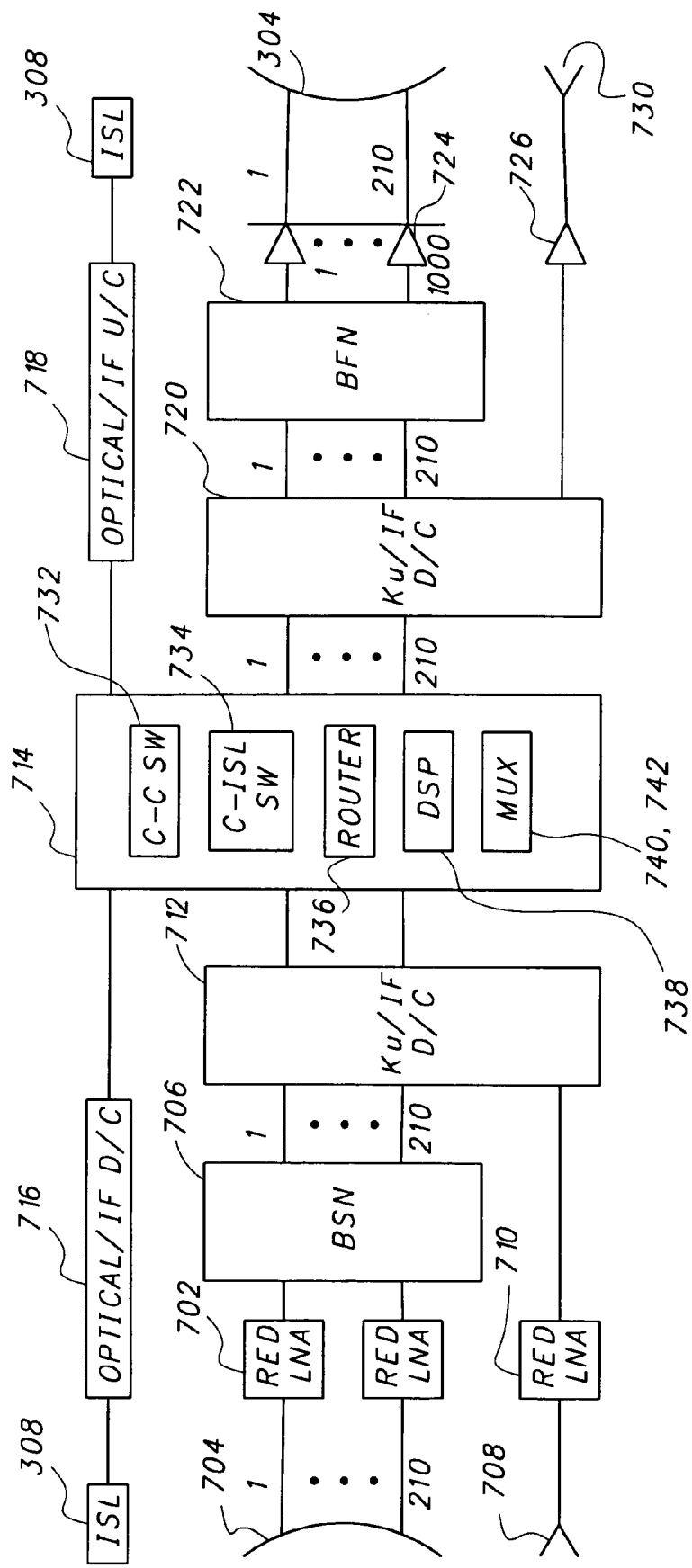
FIG. 7 is an illustrative block diagram showing a data payload handling system.

FIG. 7 is an illustrative block diagram showing the LEO SYSTEM data payload handling system. Signals of communication links arriving at each of the receive arrays are amplified by LNAs 702 attached to the array elements 704. Following the LNAs 702, the signal from each array element 704 is divided into equal parts and directed to an analog beam-switching network (BSN) 706. The BSN 706 combines the array element signals, adjusting the phases as appropriate to properly form the 30 active defined clusters 122 or 210 beams. Phases within each BSN 706 are adjusted to select its beams and keep them pointed at its users till another beam handover/satellite handover happens.

Following the BSNs 706, the signals from each beam are down-converted to an intermediate frequency (IF) by the Ku/IF downconverter 712. The IF 100 MBPS carriers then passed to a microwave switch such as the flexible channelizer 714.

The flexible channelizer 714 directs each of the uplink signals to its appropriate destinations, the gateway 106 in the same cluster 122, another gateway. Carriers derived from the optical crosslinks 104 also are directed through an optical/IF downconverter 716 and the flexible channelizer 714. At the output of the flexible channelizer 714, those signals to be sent to another satellite 102B are routed to the intersatellite link subsystem via the IF/Optical upconverter 718. Those signals intended for a downlink beam on the same satellite are recombined by the flexible channelizer 714 with the outputs of the digital signal processor in a band, up-converted by the IF/Ku upconverter 720 and then sent to the transmit beam-forming network 722, through RF amplifiers 724 and transmit antennae 304.

Any lower rate data signals previously separated by input multiplexers 740 at the repeater input to a digital signal processor 738 where the signal band is demodulated into individual digital data packets. The packets are directed to the appropriate downlink beam using the router 736, which also has as input and output signal interfaces to the optical crosslinks 104. The packets are reassembled into continuous data streams, and those destined for Ku-band spot downlinks are modulated onto high capacity OQPSK carriers for recombination with the 100 MBPS carriers at the output multiplexer 742.

Optical intersatellite link (ISL) terminals 308 may be used for inter operation with other satellites 102. Signals from these ISL terminals 308 are interfaced with the uplink signals to the satellite 102 and prepared for transmission to the ground or passed on to another satellite 102 by an intersatellite link 104.

The satellite data communications system can provide a data throughput rate of 200 MBPS for each of the 210 beams per satellite, resulting in a total data throughput of 42 GBPS per satellite.

Antennae

LEO SYSTEM 100 antennae are designed in conjunction with the communications and spacecraft bus systems to provide maximum coverage performance within an efficient system package. The system includes the following components: (1) two direct radiating transmit arrays 304 or feed-array antennas, each providing 867 beam positions with dual polarization; (2) two direct radiating receive arrays 306 or feed-array antennas, each providing 867 beam positions with dual polarization; (3) at least 4 ISL terminals 308 provide connection for two adjacent satellites in the same orbital plane and two satellites in the adjacent planes; and (4) a telemetry and command antenna system consisting of two horn antennas providing TT&C services.

The telemetry signals also serve as tracking beacons for the ground communication antennas. The forward antenna is a ±22.50-degree horn used for normal on orbit operation. The aft antenna is a ±70-degree horn used for emergency operations. The spot beam coverage is provided by four antenna assemblies, including the transmit array antenna 304 and the receive array antenna 306. All four antennae 304, 306, as well as the optical ISL units 308, are mounted on the Earth-facing side of the satellite 102 body. Arrays 304, 306 are mounted in fixed positions and do not require deployment. Two antennae 304 of about 0.75 meter aperture diameter are used for transmit operations and two antennae 306 of about 0.65 meter aperture diameter are used for receive operations. Each spot beam produced by these antennas has a beamwidth of about 4.0 degrees.

Figure 8:
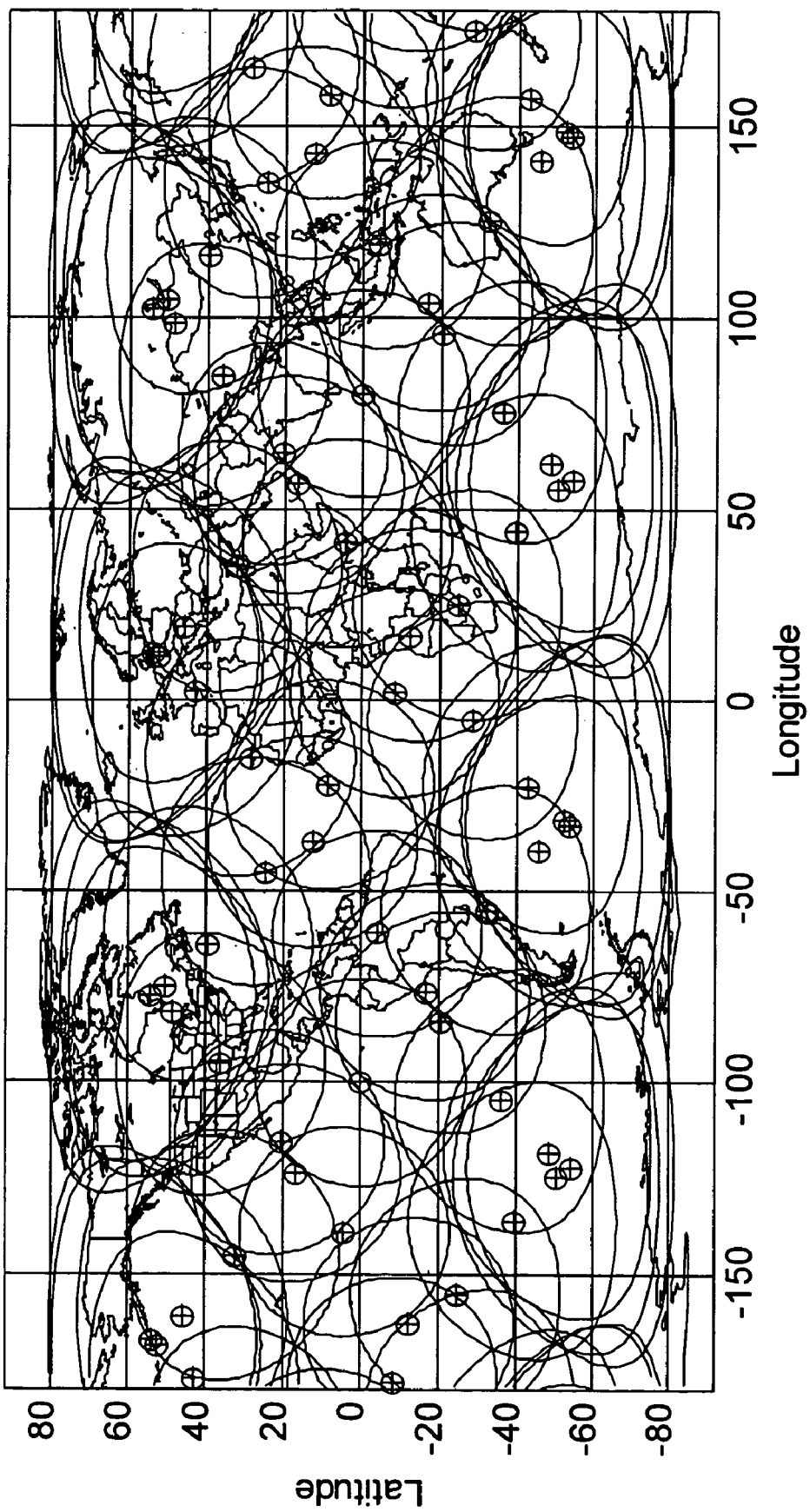
FIG. 8 is a plot illustrating the field of view obtained from the satellite system with 70 satellites.

FIG. 8 is a plot illustrating a 10 degree contour showing the field-of-view (FOV) of the LEO SYSTEM 100 with 70 satellites 102. As shown, the LEO SYSTEM 100 provides complete coverage to all 50 states, Puerto Rico, and the U.S. Virgin Islands, as well as virtually complete global coverage with a high percentage of dual-satellite visibility.

Figure 9:
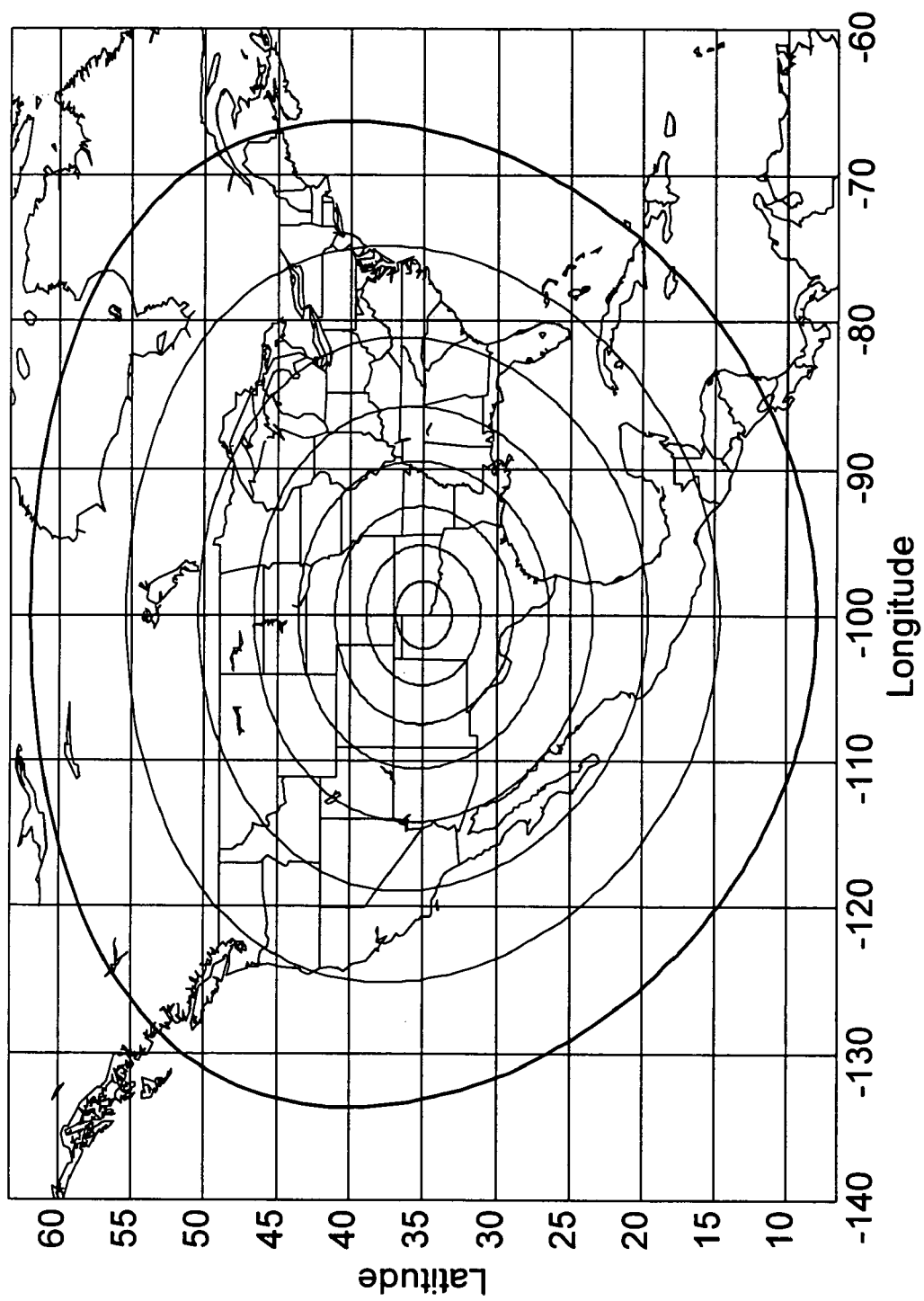
FIG. 9 is a plot showing elevation angle contours for a satellite deployed over the United States.

FIG. 9 is a plot showing elevation angle contours for an LEO SYSTEM satellite 102 when it covers the United States. Contours are shown in increments of 10° starting with 80° as the innermost contour and 10° as the outer-most contour. As FIG. 9 indicates, an LEO SYSTEM satellite 102 covers all of CONUS when its subsatellite point is near the center of CONUS.

TDMA Switch

Satellite-switched TDMA is used to route uplink users to downlink users for the 100 MBPS carriers. The TDMA switch routes each TDM channel at a particular time in a particular uplink beam to its assigned downlink beam. The TDMA switch time-gates uplink traffic to the appropriate downlink. Synchronization information is transmitted to all user ground terminals 114 to synchronize their transmission, reception, and demodulation equipment to the satellite TDMA switch.

Digital Signal Processor

The digital signal processor (DSP) subsystem 738 provides the required interconnectivity for the packet-switched portion of the communications payload. The uplink frequency band segment for each beam containing the packetized data at 10 MBPS and below is sent to the demodulator portion of the DSP, where the signals are all demodulated and the error correction coding removed. The individual data packets are then sent to a router, which directs them to the appropriate downlink data stream based on the address information contained in the packet header. The resulting data streams for each downlink beam are then buffered and either remodulated onto high speed 100 MBPS TDM OQPSK carriers for transmission by Ku-band spot beam downlinks or sent directly to the optical intersatellite links.

Optical Intersatellite Links (ISLs)

ISLs 104 are used to interconnect satellites to provide globally interconnected services through connections with other satellites. Selected outputs of the on-board digital signal processor 738 are routed to the laser intersatellite payload where the data will be processed to provide 3.5 GBPS maximum intersatellite link capability. A 1.55 μm wavelength is selected to allow use commercial equipment appropriately modified for a space environment.

Space Segment Bus Subsystems

Each of the satellites 102 in the constellation operate in inclined orbits at 1490 km altitude. Antennae, including the transmit array antennae 304 and the receive array antennae 306 are oriented to the nadir and the solar cell arrays are oriented toward the sun This orientation (also known as sun-nadir steering) maximizes power collection and heat rejection.

The satellite 102 structure provides a stable platform throughout its mission life. The structure is optimized to efficiently distributes launch loads and is compatible with many launch vehicles.

Tracking, Telemetry, and Control Subsystem

The satellite 102 also comprises a tracking, telemetry, and control subsystem (TT&C) that provides antennae, receivers, transmitters, and digital equipment to support spacecraft commanding, monitoring, and ranging during all phases of the mission and operation. The subsystem receives and demodulates a command uplink and relays the command data to a central telemetry and command unit (CTCU) for processing. The TT&C subsystem modulates the telemetry subcarrier from the CTCU onto the RIF downlink carrier. The subsystem also demodulates ranging tones from the uplink carrier and remodulates the tones onto the downlink carrier to allow accurate ground determination of spacecraft. The on-orbit tracking, telemetry, and control subsystem will be operated in Ku-band. Telemetry signals will have the same circular polarization as the communications downlink signals, and command signals will have the same circular polarization as the communications uplink signals.

Attitude Control

The satellite 102 also includes an attitude control subsystem having attitude rate and position sensors, attitude control actuators, and the associated electronic processing. A spacecraft control processor (SCP) processes sensor input signals and controls the attitude actuators and processes orbit data during the various mission phases. The attitude control subsystem (ACS) is a zero-momentum bias system with sun-nadir steering to optimize power and thermal performance. The system actuators include four reaction wheels for control torques about all three axes, with 4 for 3 redundancy 9 thrusters for acquisition and station-keeping maneuvers, and solar wing drives for pointing the solar wings.

Propulsion

The satellite 102 also comprises a liquid propulsion subsystem, which performs satellite velocity and attitude control maneuvers in response to onboard and ground commands. The propulsion subsystem includes two fully redundant subsystems, with 12 thrusters (six per subsystem) that are used to provide spin and/or attitude control during injection error correction, orbit maintenance, and maneuvers including station-keeping, phasing, and end-of-life deorbit and on-orbit operations.

Electric Power

The satellite 102 also includes an electric power subsystem, which provides electrical power for all of the subsystems on the spacecraft. The satellite uses a single 50-volt regulated bus and collects its energy through two solar wings that are capable of generating approximately 10 kW of power at end-of-life. A battery charged by the solar array supplies full power to the spacecraft during solar eclipses. The electric power subsystem includes power electronics having an integrated power controller (IPC) and a battery cell voltage monitor. Centralized power fusing, switching, and bus current telemetry are provided by the bus power distribution units and payload power distribution units.

Thermal Control

The satellite 102 also comprises a thermal control subsystem, which provides a controlled thermal environment throughout the mission. The thermal control subsystem comprises a plurality of radiator panels, which reject internally dissipated heat to space and are "isothermalized" with embedded heat pipes. Heaters are used to limit the lower temperature extremes of the satellite's equipment.

Satellite Constellation

The LEO SYSTEM 100 space segment includes 70 technically identical satellites 102, and an appropriate number of in-orbit and on-the-ground spares included for enhanced system reliability. The satellites 102 orbit at 1,490 km, in ten circular planes of seven satellites each inclined at 54.5 degrees. The 1,490 km orbital altitude corresponds to a 1.93 hour orbital period. The LEO SYSTEM satellite 102 constellation provides complete coverage up to 70 degrees latitude, which includes all of the U.S. (including Alaska and Hawaii). Partial coverage is available at latitudes between 70 degrees and 80 degrees. This is highly compatible with a minimum elevation angle of 90 degrees. LEO SYSTEM 100 constellation coverage is uniform with respect to longitude and symmetric about the equator.

Figure 10:
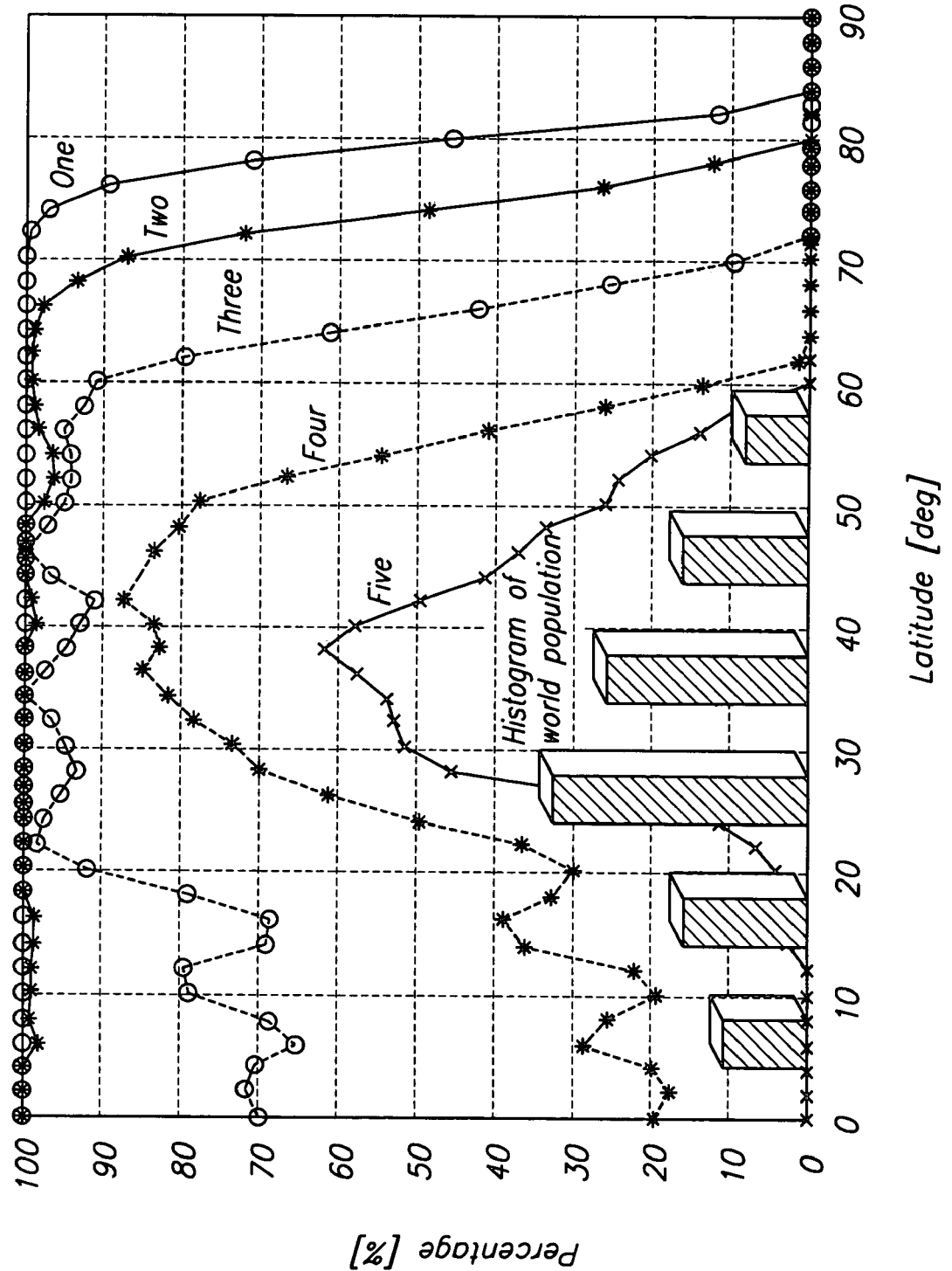
FIG. 10 is a diagram showing statistics regarding the number of visible satellites of the system constellation as a function of latitude.

FIG. 10 is a diagram showing the number of visible satellites of the LEO SYSTEM 100 constellation as a function of latitude. As shown in FIG. 10, continuous single LEO SYSTEM satellite 102 link occurs for all latitudes up to 70 degrees. Double satellite links are available for latitudes between 0 degrees and 68 degrees for over 90% of the time. Triple links are present for latitudes between 20 degrees and 60 degrees for over 90% of the time. This constellation optimizes the occurrence of three satellite link diversity within the northern and southern latitude boundaries of 20 degrees to 60 degrees, the areas of greatest global population density.

Ground Segment

Two fully redundant centers control and manage the LEO SYSTEM 100 constellation; a Satellite Operation Center (SOC) 128 and a Network Operations Center (NOC) 124. The SOC 128 manages all satellites 102 and their orbits. The SOC 128 also has primary responsibility for real-time and direct communication with satellites to accomplish functions such as connection management, access control, handovers, power control, and polarization and spectrum usage control.

The NOC 124 manages user access to the system and payload operations. This is accomplished by inter-operation with SOC 128 operations. The payload is managed in order to control beam-to-beam and satellite-to-satellite handovers, power levels, and polarization and spectrum usage. Beam-to-beam handovers may occur when the coverage of a satellite beam moves off of an earth station since the beam pattern is fixed relative to the satellite 102. Satellite-to-satellite handovers may occur to maintain sufficient satellite visibility even as one satellite 102 moves out of view. As described herein it also occurs to avoid harmful interference situations. Individual beam power levels may be varied if necessary to maintain a constant power flux density at the earth under varying propagation conditions, and to account for variations due to interference mitigation techniques and other factors. Beam polarization and spectrum usage may be varied to avoid interference and satisfy region specific regulatory constraints. The NOC is also primarily responsible for functions such as resource management, fault management, accounting, and billing.

To achieve availabilities of 99.5% to 99.7%, multiple classes of terminals are employed, depending on earth station location, service category, and other system parameters. In one embodiment, the ground terminals include a UT 114, and gateway terminal 106. The UT 114 provides a data rate of up to about 100 MBPS, and the Gateway terminal 106 provides a data rate of up to about 700 MBPS. Tables III and IV below summarize the illustrative terminal characteristics.

TABLE III

Illustrative User Terminal Characteristics

| | |
|---|---|
| RIF Transmit Frequencies | 12.75–13.25 GHz and 13.75–14.5 GHz |
| RIF Receive Frequencies | 10.7–11.7 GHz or 10.7–11.75 GHz |
| Antenna Aperture | 90 cm (35.4 in) |
| Terminal Transmit Power | 10 W (Peak) |
| Terminal Scan | 2 Axis Tracking |
| Receiver Noise Figure | 1.5 dB |
| Maximum Data Rate | 100 MBPS |

TABLE IV

Illustrative Gateway Terminal Characteristics

| | |
|---|---|
| RIF Transmit Frequencies | 12.75–13.25 GHz and 13.75–14.5 GHz |
| RIF Receive Frequencies | 10.7–11.7 GHz or 10.7–11.75 GHz |
| Antenna Aperture | 6 meters |
| Terminal Transmit Power | 70 W |
| Terminal Scan | 2 Axis Tracking |
| Receiver Noise Figure | 1.5 dB |
| Maximum Data Rate | 700 MBPS |

Interference with Non-LEO SYSTEM Satellites

Interference can occur when the desired carrier-to-interference ratio (C/I) drops below a required protection threshold. To minimize the level of interference to and from other satellite systems, LEO SYSTEM 100 uses spectrum sharing techniques that include satellite diversity (the availability and use of multiple satellites by handover switching and other augmentation) and narrow beamwidth antennas. Additionally, the LEO SYSTEM satellite 102 constellation parameters are selected and designed, to minimize potential interference to GSO services.

The extremely narrow beamwidth of the LEO SYSTEM optical transceivers 308 for the ISLs 104 ensure that satellite receivers outside the direct path of its laser beams will avoid harmful interference. The narrow beamwidths prevent, as a practical matter, other satellites from blocking the lines-of-sight of the transceivers. For these reasons, and because orbits and other parameters will differ between systems, the possibility of harmful interference occurring between inter-satellite links of different systems is negligible.

Figure 11:
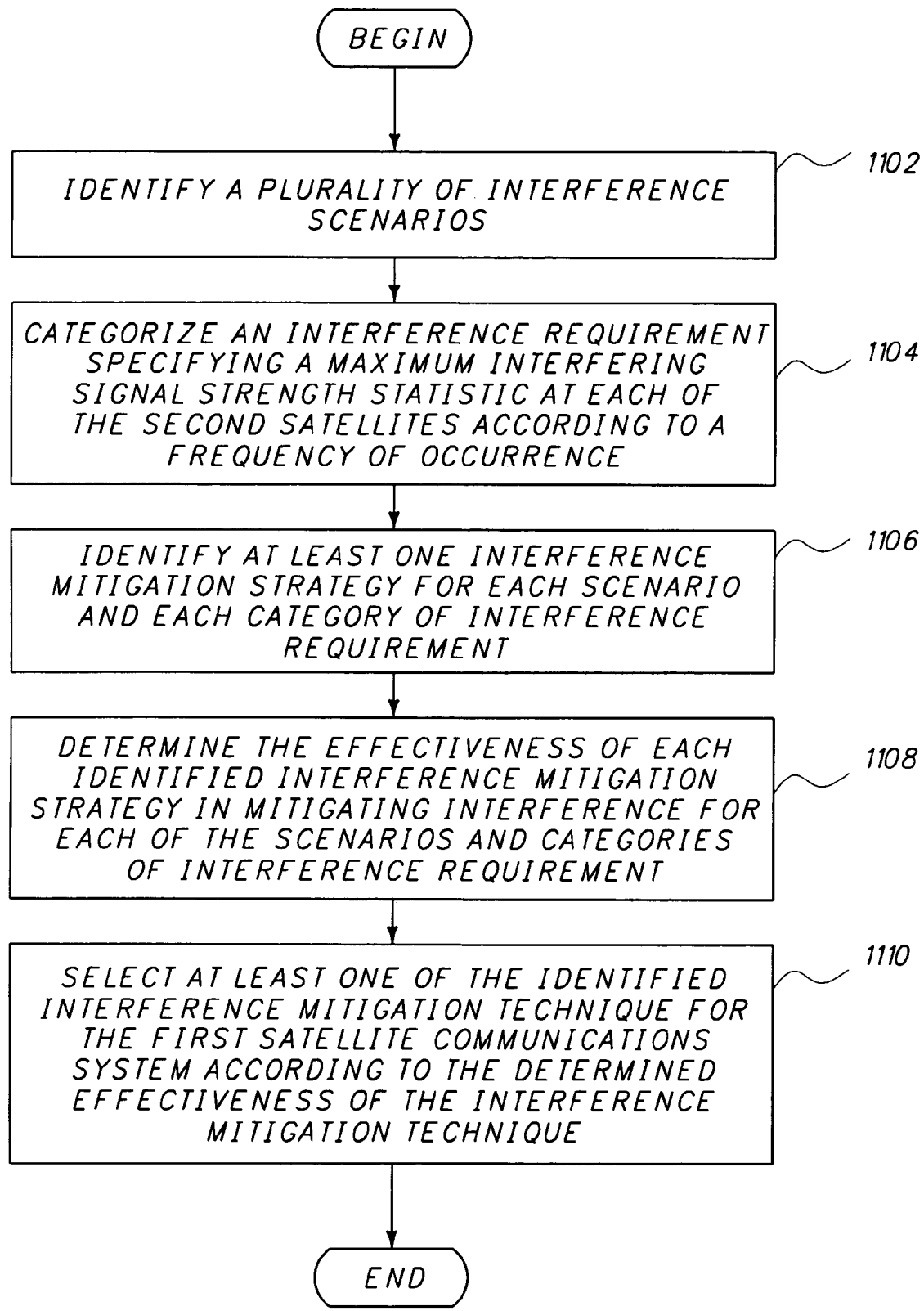
FIG. 11 is a flow diagram illustrating method steps used to design satellite communications system.

FIG. 11 is a flow diagram illustrating method steps used to design a satellite communications system with a system-level approach to meeting communications interference requirements with other satellites. Typically, the interference requirement is expressed as the a maximum equivalent power flux density (EPFD) or average power flux density (APFD), usually in units of dBW/meter$^2$/4 KHz at the antenna(e) of the other (interfered with) satellites. A plurality of interference scenarios are identified, as shown in block 1102. Then, the interference requirement (such as the EPFD above) is categorized according to a frequency of occurrence, as shown in block 1104. At least one interference mitigation strategy is identified for each scenario and each category of interference requirement, as shown in block 1106. If desired, a particular interference strategy can be employed for more than one scenario and frequency of occurrence. The effectiveness of each identified interference mitigation strategy is then determined for each of the scenarios and categories of interference requirement. This is depicted in block 1108. If desired, this step can be performed only for those scenarios and strategies that drive (are major factors in) the design of the satellite communication system. At least one of the interference mitigation strategies are then selected 1110, in accordance with the results obtained in block 1108.

In another embodiment of the invention, the method is performed by defining a short term interference requirement and a long term interference requirement from an interference requirement specifying a maximum communications interference between a satellite system in a sub-geosynchronous orbit and satellites in a satellite system in a geosynchronous orbit. The source of such interference is the off-axis sensitivity characteristics of the transmit and receive antennae used by the satellite communications systems to communicate with their respective ground stations. In one embodiment, the short term interference requirement is evidenced by interference that occurs and persists for a short period of time, but with potentially high intensity, and the long term interference requirement is evidenced by interference that occurs more often, but with less intensity. Next, the off-axis sensitivity characteristic of the antennae used in the first satellite system is selected so that the resulting sort term interference meets the short term interference requirement. Then, an antenna tracking strategy rule describing when each of the first satellites in the first satellite system is permitted to communicate with its associated ground station.

An example of the application of the foregoing method steps is described as follows. Twelve different scenarios can be defined in which there is the possibility of interference between a GSO link (an existing satellite capability) and an NGSO link. When ordered from the most significant (in terms of undesirability) they are as follows: (1) GSO earth station main beam interferes with NGSO satellite main beam; (2) NGSO satellite main beam interferes with GSO earth station main beam; (3) GSO satellite main beam interferes with NGSO earth station main beam; (4) NGSO earth station main beam interferes with GSO satellite main beam; (5) GSO earth station main beam interferes with NGSO satellite sidelobe; (6) NGSO satellite sidelobe interferes with GSO earth station main beam; (7) GSO satellite sidelobe interferes with NGSO earth station main beam; (8) NGSO earth station main beam interferes with GSO satellite sidelobe; (9) GSO earth station sidelobe interferes with NGSO satellite main beam; (10) GSO satellite main beam interferes with NGSO earth station sidelobe; (11) NGSO satellite main beam interferes with GSO earth station sidelobe; and (12) NGSO earth station sidelobe interferes with GSO satellite main beam.

The main beam-to-main beam interference in cases (1) through (4) and (8) can be avoided using satellite 102 diversity.

Figure 12:
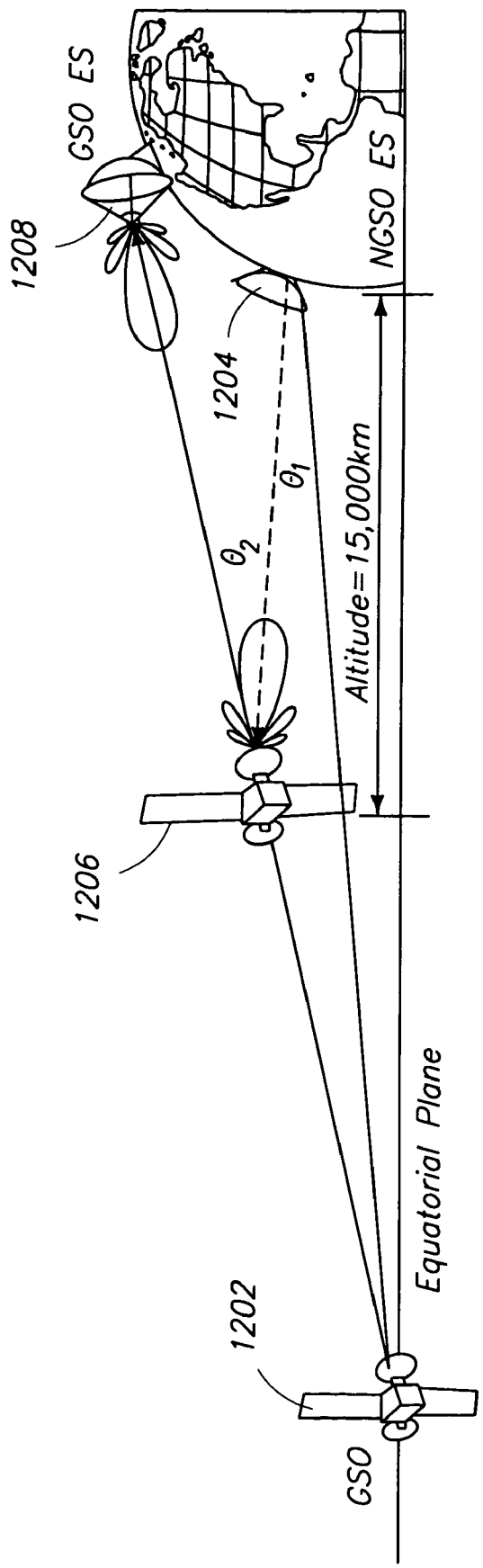
FIG. 12 depicts how the system satellites avoid main-beam-to-main-beam interference with GSO satellites using satellite diversity and sufficient separation angles between antenna boresights.

FIG. 12 depicts how LEO SYSTEM satellites 102 avoid main beam-to-main beam interference with GSO satellites 1202 using satellite diversity and a sufficient separation angle between the two antenna boresights. This strategy is effective in preventing main beam-to-main beam interference cases described in scenarios (1)–(4) and (8). This non-service zone strategy avoids transmitting a signal while any point within the beam is less than 10° separated away from a vector from the NGSO ground station 1204 (e.g. the UT 114 or gateway 106) to the NGSO satellite 1206 (e.g. satellite 102). This suggests a non-service zone for the NGSO satellite system along a GSO arc and is usually referred to as GSO arc protection zone. FIG. 12 shows that if a GSO arc protection angle ($\theta_1$) is selected to be 10° then the minimum off-axis angle from the non-GSO ($\theta_2$) into the GSO mainbeam will be more than 10°.

Figure 13:
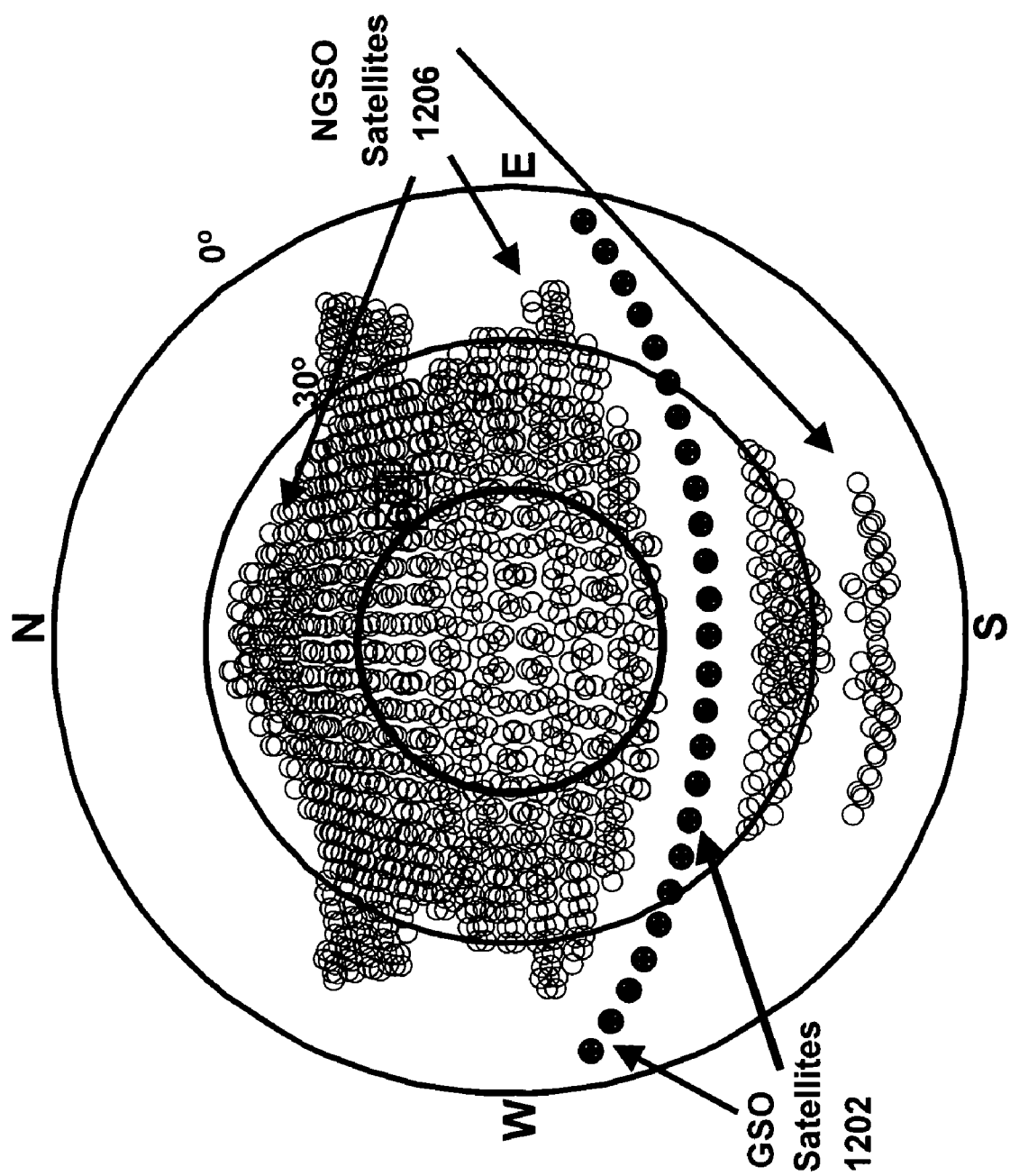
FIG. 13 shows an example illustrating the enforcement of the separation angle between GSO and NGSO boresights.

FIG. 13 shows an example illustrating the enforcement of the separation angle between the GSO and NGSO antenna boresights. FIG. 13 shows antenna tracks for the closest operational LEO SYSTEM satellite from an user terminal located at Los Angeles. The user terminal 114 switches to another visible satellite whenever the tracking LEO SYSTEM satellite 102 (those currently in communication with the UT 114) approach a GSO keepout arc defined by approximately !10 degrees. This non-operational zone is applied to protect GSO satellites from communication interference from the LEO SYSTEM satellites 102, which are shown in the center of the non-operational zone. The position of active NSO satellites are plotted as circles that populate the whole sky except the GSO protection zone. The NGSO Earth terminal switches to another satellite (handover) whenever the active satellite is no longer visible at the highest elevation angle or is flying into the GSO protection zone.

The interference in cases (5) through (12) can be sufficiently mitigated by using satellite diversity, adequate antenna boresight separation angle, and sufficient antenna discrimination. For the LEO SYSTEM system 100, ground antennae are usually larger than spacecraft antennae. As a result which implies the off-axis radiation is discriminated more by the ground antennae. As a result, the interference situations in cases (5) through (8) are worse than the interference situations in cases (9) through (12), mainly due to relatively better discrimination of off-axis radiation by ground antennas. In cases (5), (8), (9), and (12), GSO uplinks cause more interference to NGSO uplinks than the reverse cases because of the shorter propagation distance between the earth and the NGSO satellites 1206.

Thus to facilitate spectrum sharing, the LEO SYSTEM system 100 is designed to provide (1) sufficient ground antenna discrimination, (2) sufficient spacecraft antenna discrimination and antenna boresight separation angle, and (3) sufficient satellite visibility statistics. Both the separation angle between GSO 1202 and NGSO satellites 1206 as seen by a GSO earth station 1208 and the separation angle between GSO 1208 and NGSO earth stations 1204 as seen by an NGSO satellite 1206 must be sufficient to account for the NGSO satellite 1206 slant range, and the power flux density it radiates. The selection of the angle between GSO and NGSO satellites 1202, 1206 must also account for a reasonable estimate of the GSO earth station antenna discrimination characteristics, and the angle between NGSO and GSO earth stations must also account for the NGSO satellite 1206 antenna discrimination characteristics.

Figure 14C:
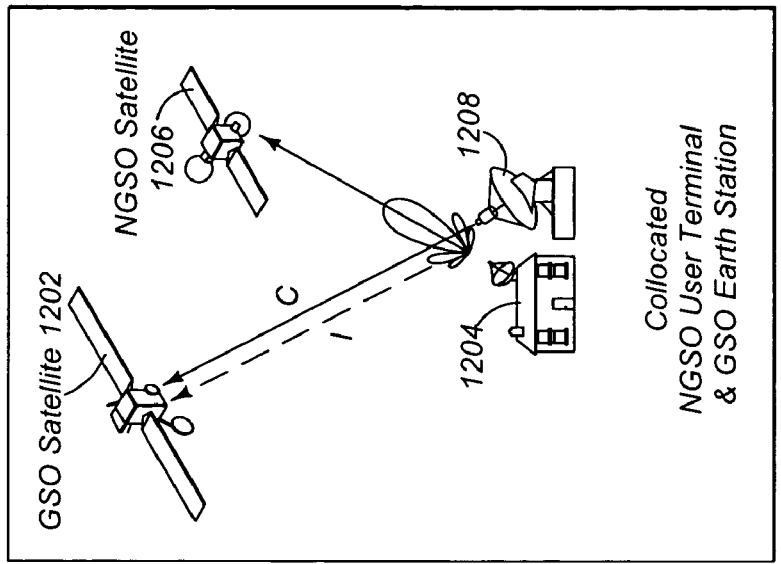
FIGS. 14A–14C are diagrams illustrating additional scenarios in which the system satellites may interfere with the communications with existing GSO satellites.
Figure 14B:
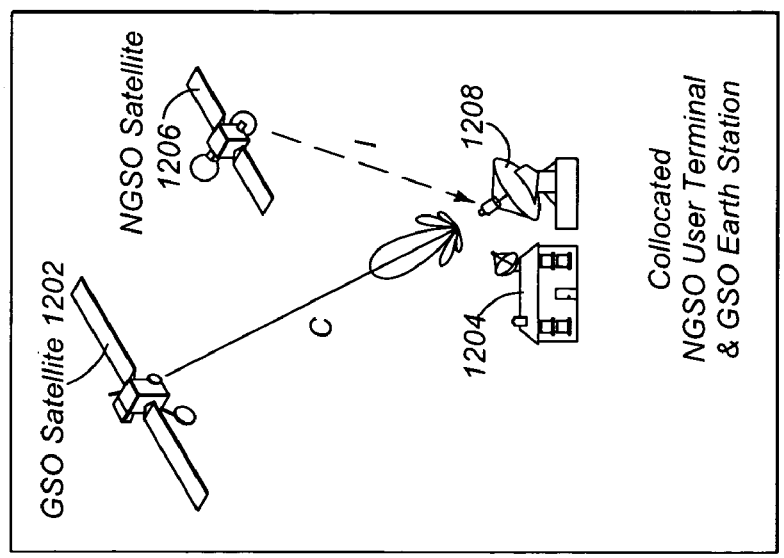
Figure 14A:
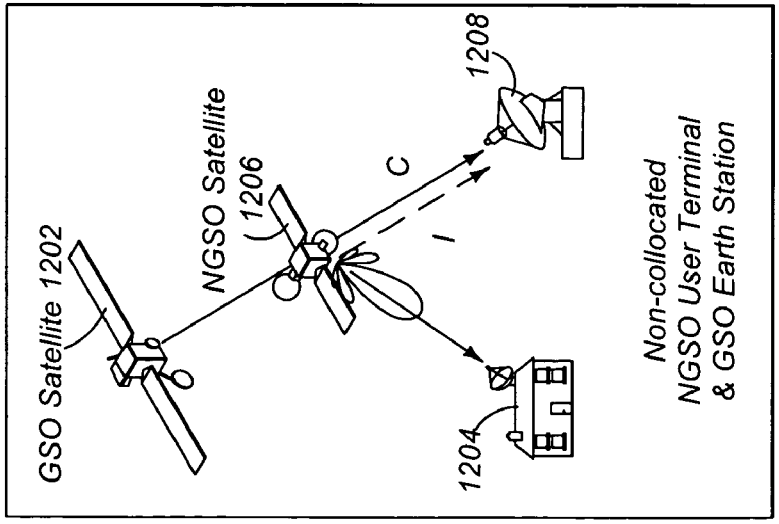

FIGS. 14A, 14B, and 14C are diagrams illustrating additional scenarios in which the LEO SYSTEM 100 could possibly interfere with GSO satellites 1202 and their links.

FIG. 14A illustrates scenario (6), while FIGS. 14B and 14C illustrate scenarios (11) and (12), respectively. Presuming that scenarios (1), (2), (3) and (4) are removed by the use of a GSO non-service zone, these scenarios are significant contributors to the overall interference.

Scenario (6) involves interference from an off-axis emission of energy from the NGSO satellite 1206 antennae (for example, via the antennae sidelobes) when transmitting to a NGSO earth station 1204 such as UT 114 located some distance away from the GSO earth station 1208. Scenario (11) involves interference from an NGSO satellite 1206 transmitting to an NGSO earth station 1204 co-located or nearly co-located with a GSO earth station 1208. In this case, transmissions from the GSO satellite 1202 can be interfered with by reception of signals from the NGSO satellite via sidelobes or other off-axis sensitivity characteristics of the GSO earth station antenna. Scenario (12) involves interference from an NGSO earth station 1204 co-located at or near a GSO earth station 1208 transmitting to the NGSO satellite 1206. In this case, energy transmitted from the NGSO earth station 1204 via a sidelobe or other off-axis source is received by the GSO satellite 1202, and interferes with signals transmitted to the GSO satellite 1202 from the GSO earth station 1208.

Different interference mitigation techniques can be employed to reduce interference in the above-described scenarios. First, the interference requirement can be categorized into frequency of occurrence statistics describing how frequently the interference scenario is expected to be encountered. For example, the frequency of occurrence statistic can be described by the total number of seconds that the conditions of interference scenario occur in a single day. In one example these statistics are categorized as such as short term, transition, and long term. Interference conditions in the short term category tend to happen a small percentage of the time, but often involve high levels of interference. Interference conditions in the long term category happen more often—perhaps 1% of the time—but generally involve lower levels of interference. Interference conditions in the transition category fall between these two extremes. Each of these interference categories is presented with a corresponding mitigation strategy in Table V below.

TABLE V

| | Short Term | Transition | Long Term |
| --- | --- | --- | --- |
| Case (6) | Provide GSO Non-Service Zone & Reduce NGSO Spacecraft Antenna Sidelobe Directivity | Dominated by Case B | Dominated by Case B |
| Case (11) | Provide GSO Non-Service Zone | Apply Less-Interfering Tracking Method | Apply Less-Interfering Tracking Method |
| Case (12) | Provide GSO Non-Service Zone | NA | NA |

With regard to scenario (6), the imposition of a GSO non-service zone of 10 degrees is insufficient to comply with the short term interference requirement.

Consequently, an additional interference mitigation strategy is employed, namely that of reducing the NGSO satellite 1206 antenna sidelobe directivity. In one embodiment, the antenna sidelobe directivity is selected to be approximately 4 degrees, as shown in FIG. 5. Transition and long term interference requirements are dominated by considerations that are present in scenario (11).

With regard to scenario (11), a short term interference requirement can be met with the employment of the GSO non-service zone described earlier above. However, the non-service zone is not an effective interference mitigation strategy for interference that is categorized as long term or transitional. To meet these interference requirements in scenario (11), an additional interference mitigation strategy is employed. This "diversity" based mitigation strategy involves a modification of the tracking algorithms, which determine which NGSO ground stations 1204 communicate with which NGSO satellites 1206.

Table VI below presents a summary of potential mitigation strategies.

TABLE VI

|  | Hand-over When | Hand-over To |
| --- | --- | --- |
| Method 1 | satellite is no longer the one with highest elevation angle | A new satellite with the highest elevation angle |
| Method 2 | satellite drops below minimum elevation angle (9°) | The one with the highest elevation angle |
| Method 3 | satellite drops below minimum elevation angle (9°) | A random visible satellite |
| Method 4 | satellite is no longer the one with largest separation angle | A visible but with large separate away from GSO arc |

Figure 15:
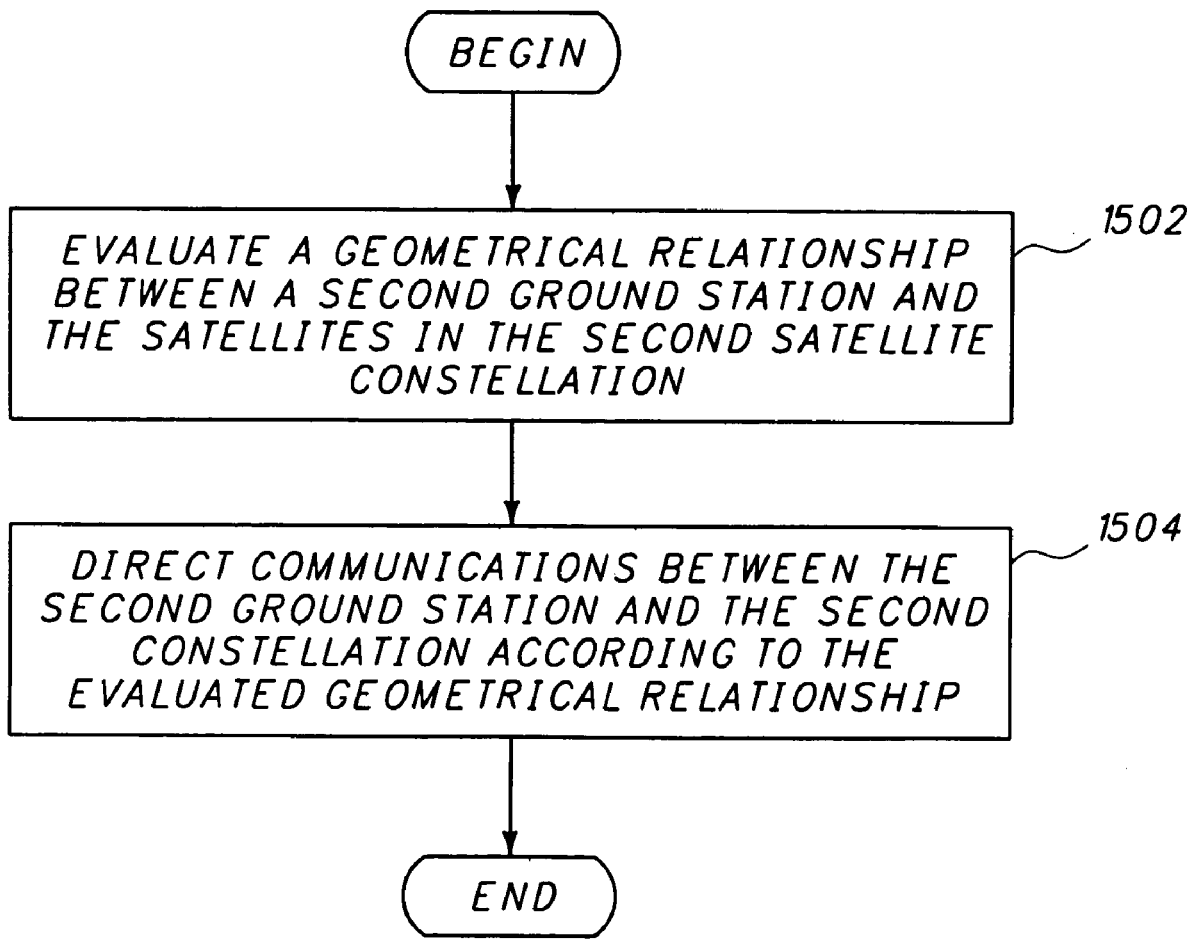
FIG. 15 is a flow diagram showing exemplary method steps employed in one embodiment of the mitigation strategy.

FIG. 15 is a flow diagram showing exemplary method steps employed in one embodiment of the mitigation strategy. First, a geometrical relationship between a ground station (e.g., the NGSO ground station 1204 and the satellites in the constellation (the NGSO satellites 1206) is evaluated, as shown in block 1502. Then, communications between the ground station 1204 and the NGSO satellites 1206 is then directed according to the evaluated geometrical relationship, as shown in block 1504.

Figure 16:
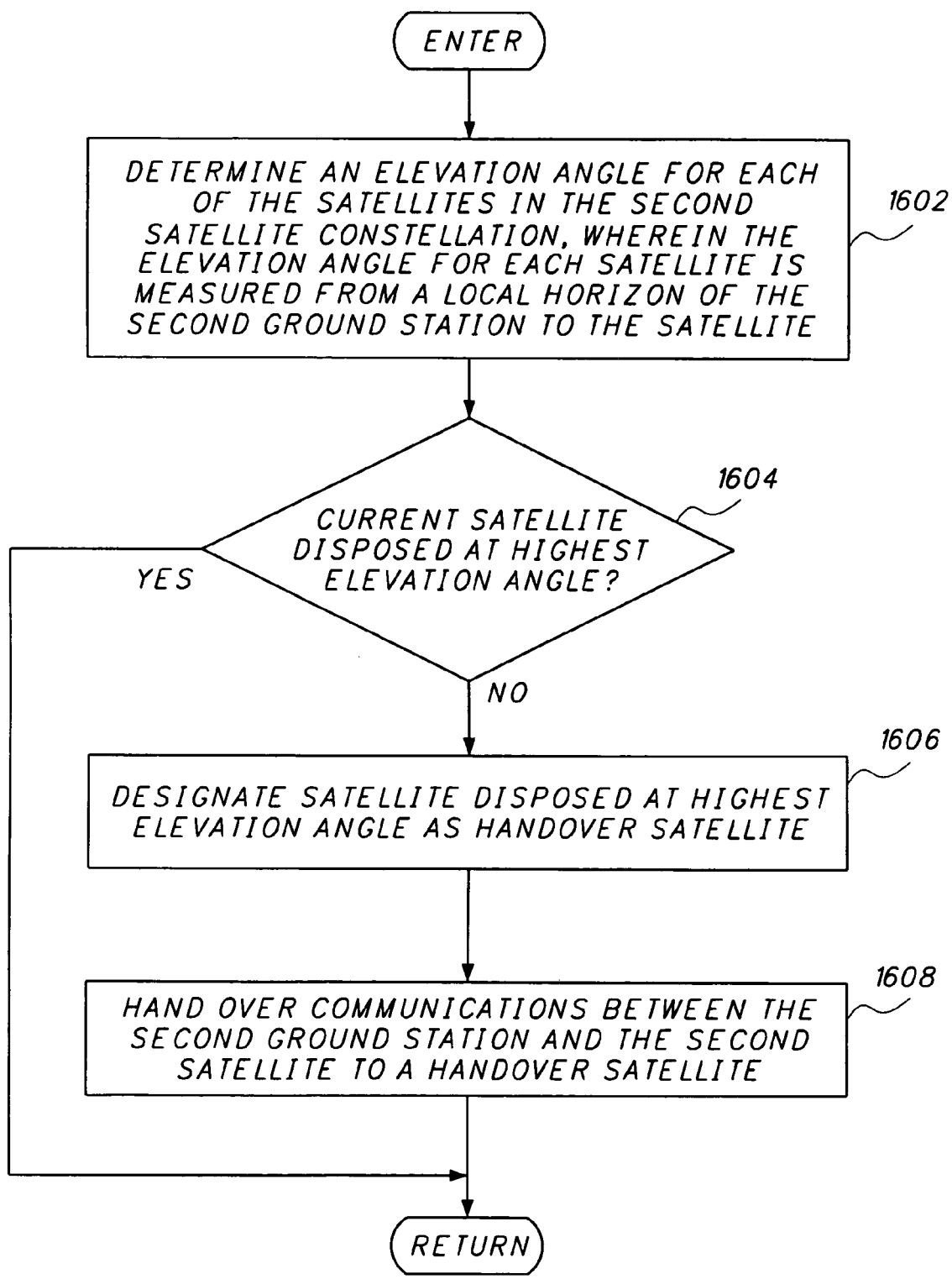
FIG. 16 is a flow diagram showing exemplary method steps employed in an embodiment of the mitigation strategy in which the elevation angles of the NGSO satellites are used as a discriminant to determine handover conditions.

FIG. 16 is a flow diagram showing exemplary method steps employed in an embodiment of the mitigation strategy in which the elevation angles of the NGSO satellites 1206 are used as a discriminant to determine the hand over conditions (when communications are handed over from one NGSO satellite 1206 to another) and to identify the handover satellite (the satellite which is assigned to handle communications formerly handled by a different satellite in the NGSO satellite constellation. This technique further reduces the statistical likelihood of an NGSO satellite 1206 or ground station 1208 interfering with a GSO satellite 1202 or ground station 1208.

Figure 17:
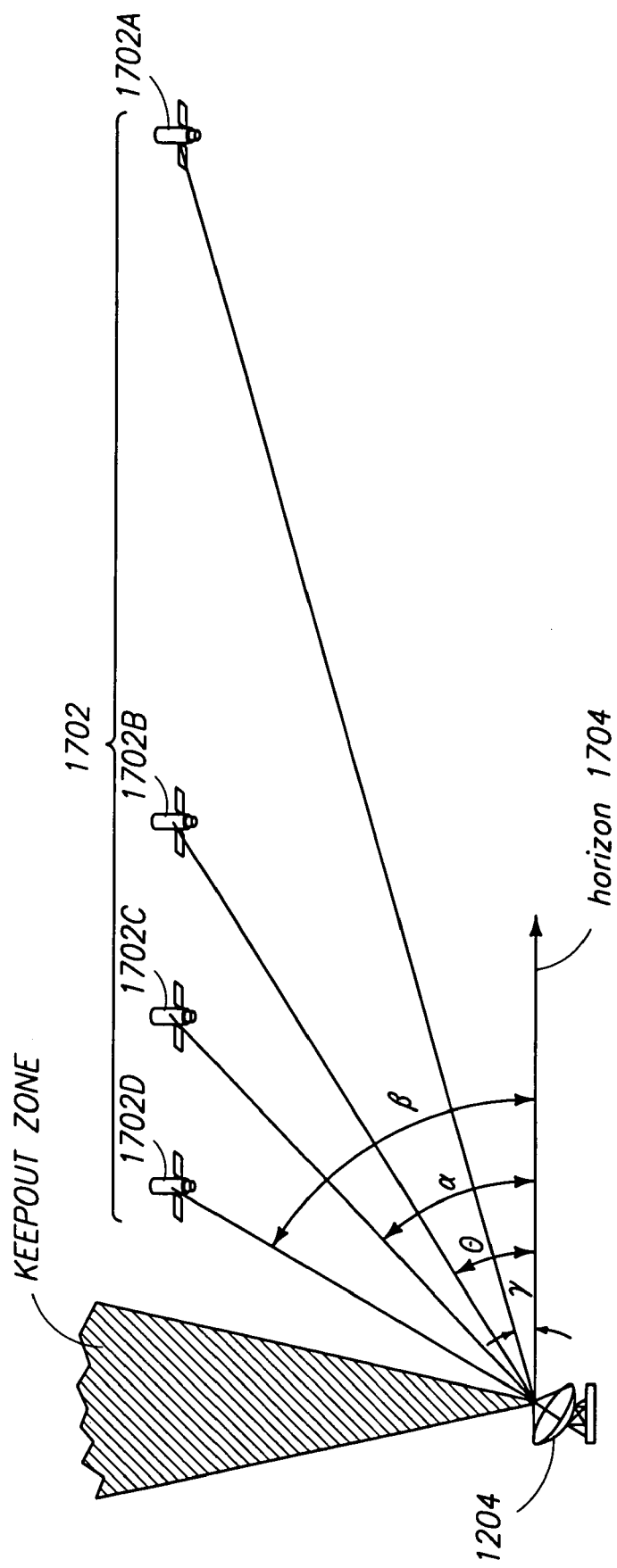
FIG. 17 is a diagram illustrating the geometrical relationships described with reference to FIG. 16.

FIG. 17 is a diagram illustrating the geometrical relationships described in the flow chart presented in FIG. 16.

Figure 18:
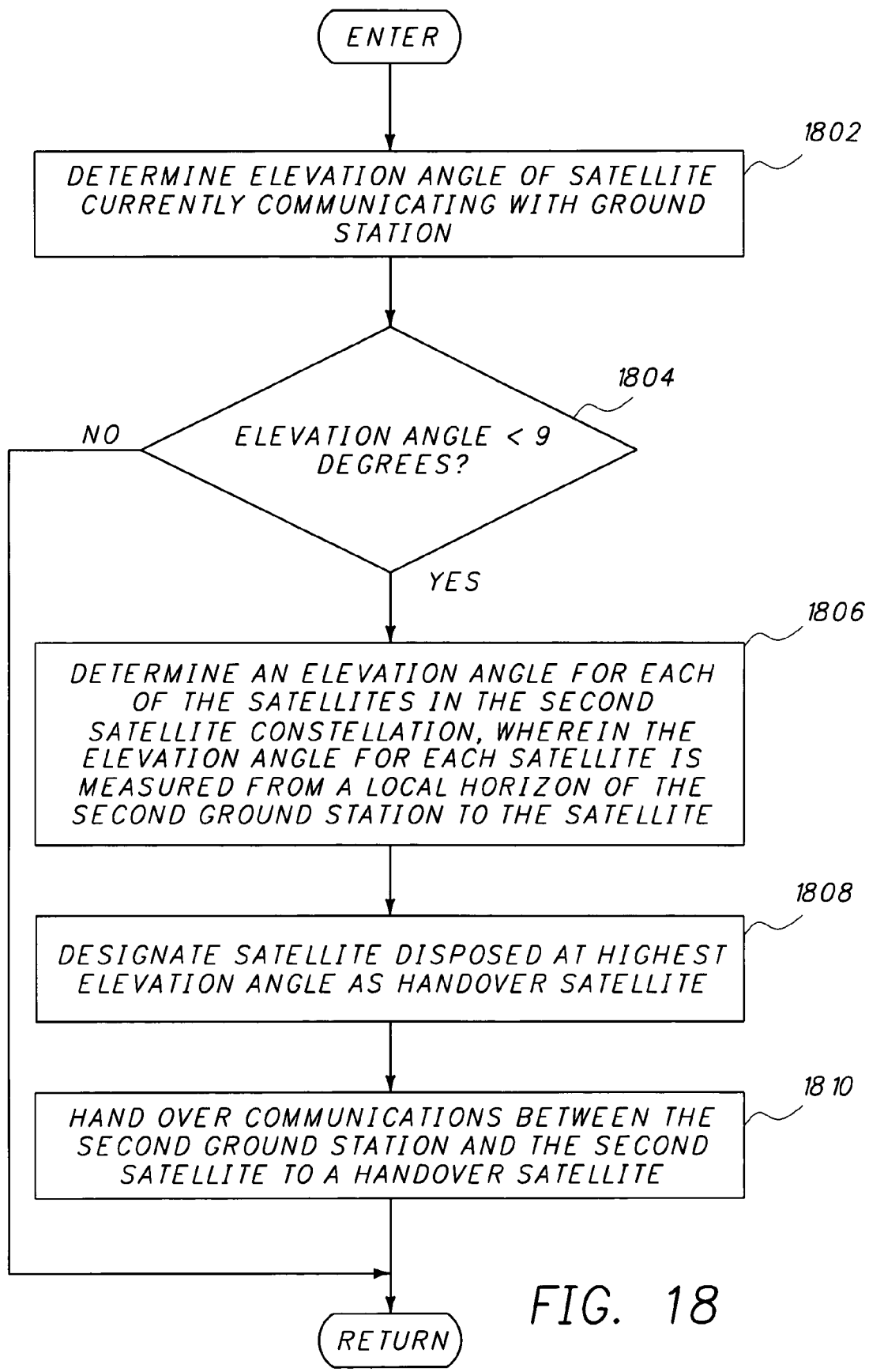
FIG. 18 is a flow diagram illustrating exemplary method steps employed in an embodiment of the mitigation strategy in which the satellite handover occurs when the elevation angle of the satellite currently in communication with the NGSO ground station drops below a minimum elevation angle.

Returning to FIG. 16, the elevation angle for each of the "visible" NGSO satellites 1702 is determined, as shown in block 1602. In this context, "visible" refers to satellites that are above the earth limb. The elevation angle of each satellite from the local horizon 1704 of the NGSO ground station 1204 is determined. This can be determined using information obtained from the SOC 128 or NOC 124 or resident at the NGSO ground station 1204. Then, if elevation angle of the satellite currently in communication with the NGSO ground station 1204 (satellite 1702A at elevation angle γ in FIG. 17), is not greater than the elevation angle for every other visible NGSO satellite 1702, the satellite at the highest elevation angle (NGSO satellite 1702A disposed at angle β in FIG. 17) is designated as the handover satellite. This is depicted in blocks 1604 and 1606 of FIG. 16. Then, communications between the NGSO satellite constellation and the NGSO ground station 1204 are handed over from the current satellite 1702A to the handover satellite 1702D, as shown in block 1608. In similar embodiment to that which is described above, the handover satellite is identified as any satellite with a higher elevation angle than the satellite currently in communication with the ground station, such as satellite 1702C. FIG. 18 is a flow diagram illustrating exemplary method steps employed in an embodiment of the mitigation strategy in which the satellite handover occurs when the elevation angle of the satellite currently in communication with the NGSO ground station 1204 drops below a minimum elevation angle (such as elevation angle γ in FIG. 17). Block 1802 determines the elevation angle of the NGSO satellite currently in communication with the NGSO ground station 1204 (e.g. satellite 1702A in FIG. 17). Block 1804 checks to see if the elevation angle of the NGSO satellite currently in communication with the NGSO ground station is less than the minimum elevation angle (angle γ in FIG. 17). If so, the elevation angle for each of the visible satellites in the NGSO constellation is determined, and the communications are handed over to the satellite at the highest elevation angle (1702D). This is depicted in blocks 1806–1810. In one embodiment of the present invention, the minimum elevation angle γ is selected to be approximately 9 degrees.

In another embodiment of the present invention, handover also occurs after the elevation angle of the current satellite drops below the minimum elevation angle γ, but the handover satellite is designated randomly from among the visible satellites (1702B–1702D), not necessarily as the satellite with the highest elevation angle. In this element, the operations depicted in blocks 1806 and 1808 are unnecessary, as the handover satellite is chosen randomly.

Figure 19:
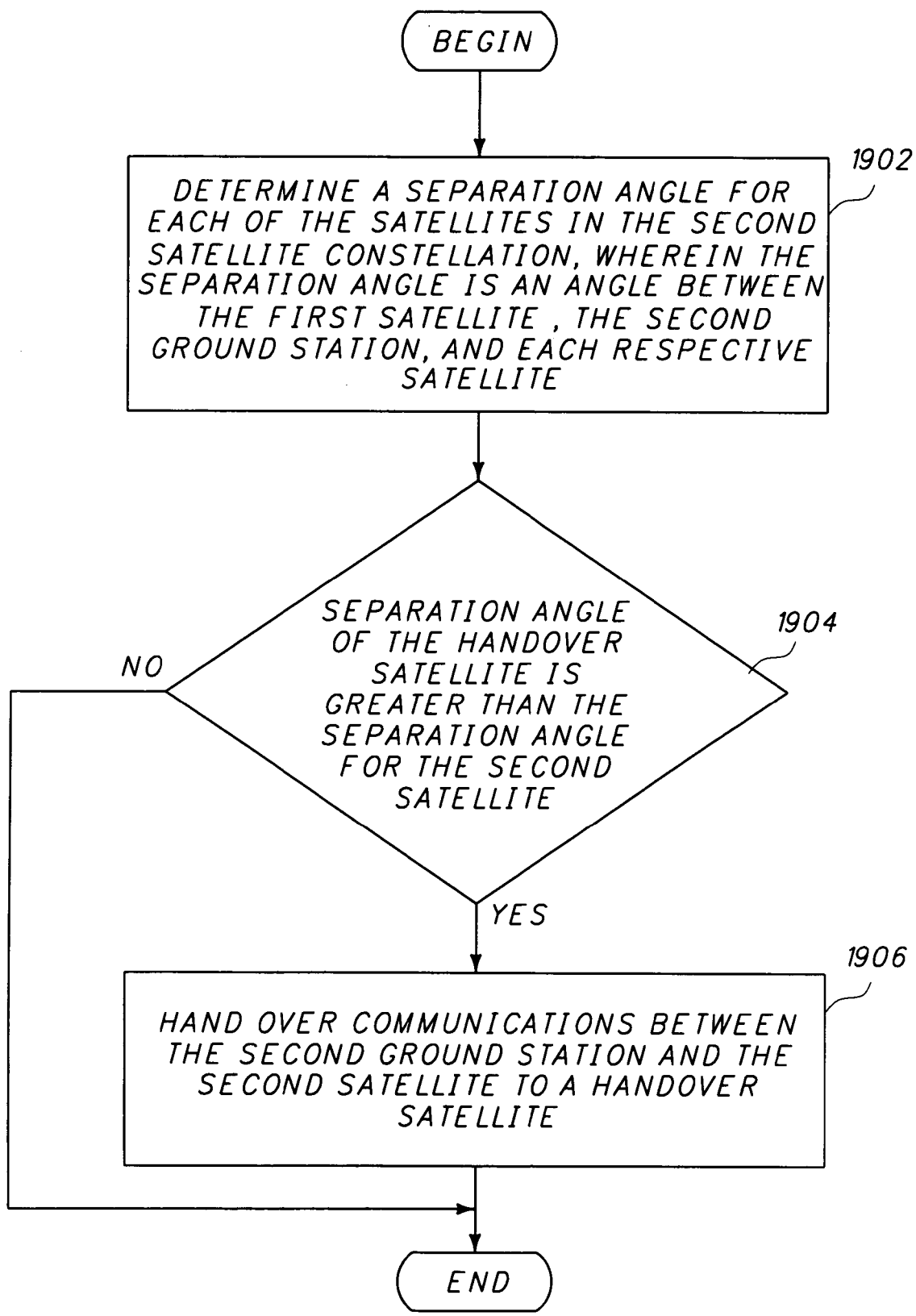
FIG. 19 is a flow diagram illustrating exemplary process steps employed in another embodiment of the present invention in which the separation angle defined by the NGSO ground station, the NGSO satellite, and the GSO satellite is used to determine handover conditions.

FIG. 19 is a flow diagram illustrating exemplary process steps employed in another embodiment of the present invention in which the separation angle defined by the NGSO ground station 1204, the NGSO satellite 1206 and the GSO satellite 1202 (denoted as $\theta_1$ in FIG. 12) is used to identify the handover satellite and to determine when communications are handed over to the handover satellite. First, a separation angle $\theta_1$ for each of the visible satellites in the NGSO satellite constellation is determined, as shown in block 1902. Then, if the separation angle $\theta_1$ of one of the satellites is greater than the separation angle $\theta_1$ of the NGSO satellite 1206 currently in communication with the NGSO ground station 1208, communications are handed over to another satellite in the NGSO satellite constellation. This is illustrated in blocks 1904 and 1906. The handover satellite can be randomly selected from the visible satellites in the NGSO satellite constellation, as the NGSO satellite with the largest separation angle, or the satellite with the highest elevation angle.

For exemplary purposes, the foregoing interference mitigation techniques have been described as they are applied to reduce interference between NGSO and GSO satellite systems. However, the foregoing techniques can also be used to prevent or reduce interference among different NGSO satellite constellations as well.

Figure 20A:
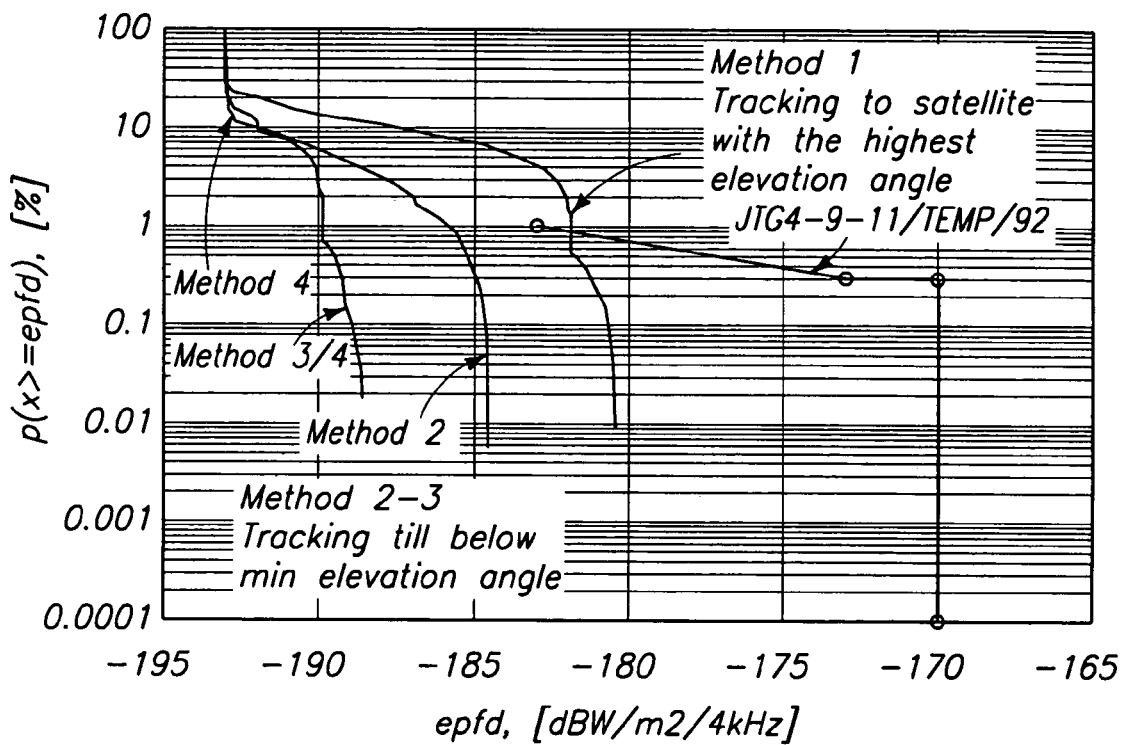
FIGS. 20A–20D are diagrams showing the predicted EPFD for the LEO SYSTEM.
Figure 20B:
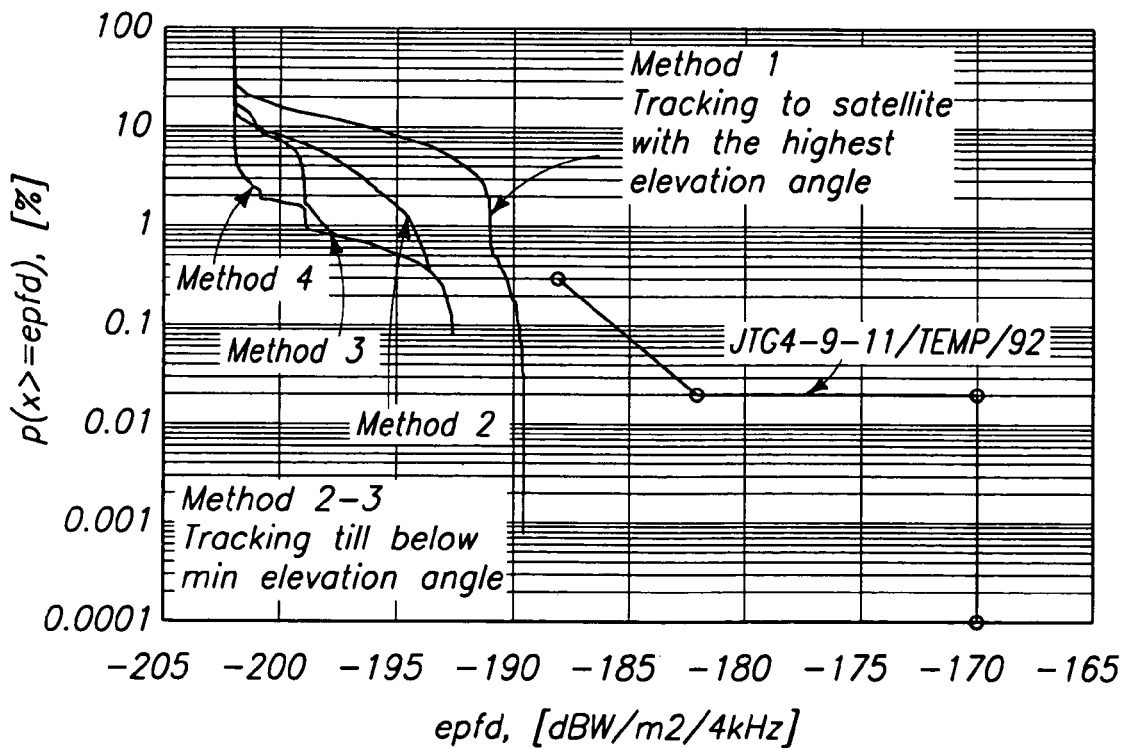
Figure 20C:
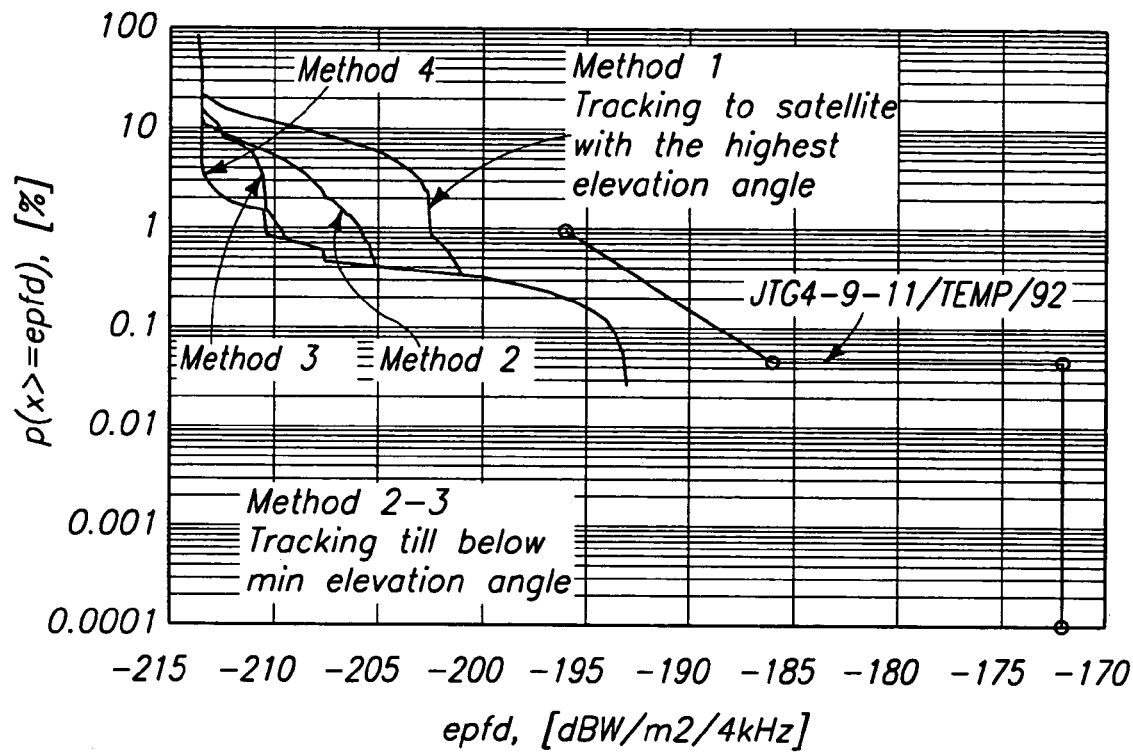
Figure 20D:
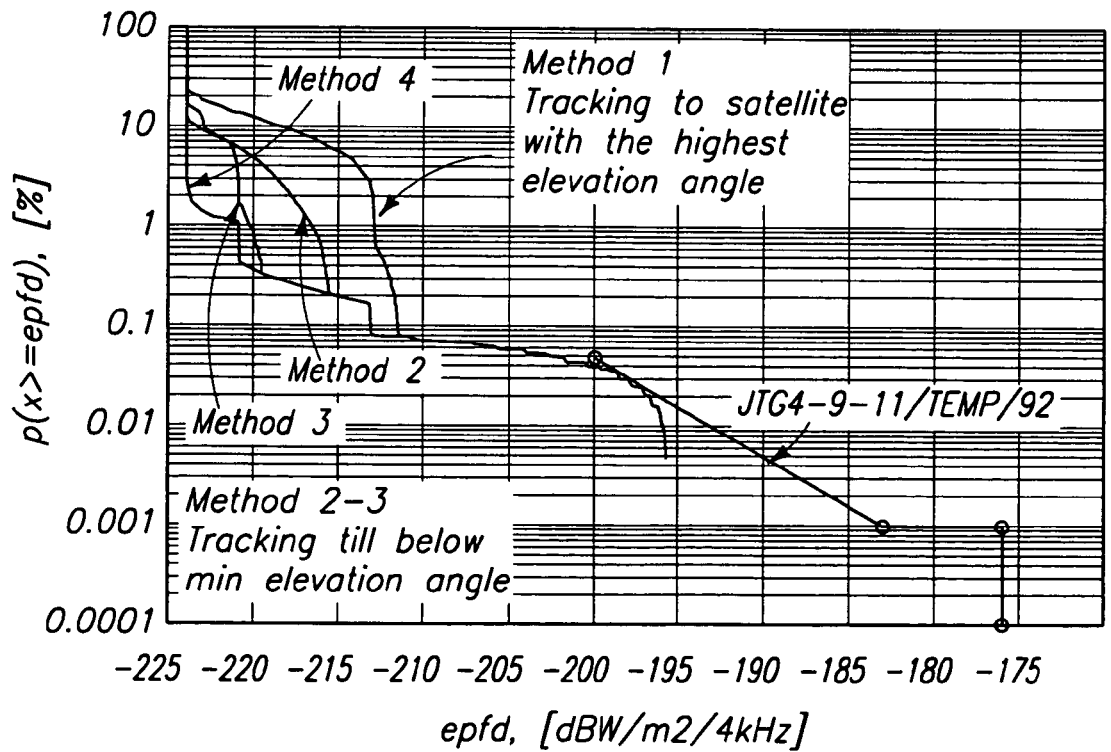

FIGS. 20A–20D are diagrams showing the predicted statistical EPFD for the LEO SYSTEM 100 using the tracking methods outlined in Table VI, and the GSO 10 degree protection zone. FIG. 20A shows the predicted statistical EPFD for the LEO SYSTEM using a 0.6 meter GSO ground station terminal 1208 antenna. FIG. 20B shows the predicted EPFD for the LEO SYSTEM 100 using a 1.2 meter GSO terminal 1208 antenna. FIGS. 20C and 20D show the predicted EPFD for the LEO SYSTEM 100 using a 3.0 meter and 10.0 meter antenna, respectively.

These results combine scenarios (6) and (11) and under the worst case geometry. In general, satellite-tracking method four provides the best protection to GSO systems and reduces the long-term interference down to non-harmful level, especially for the small sized GSO antennae. Also notice that scenario dominates the short-term interference level when the GSO ground station terminal 1208 antenna is large, and that this interference from this source can be ameliorated through satellite antenna sidelobe attenuation.

In general, scenarios (6), (11), and (12) require NGSO systems to provide sufficient number of visible satellites in order to use satellite diversity for mitigation purposes. In scenarios (6) and (11), the NGSO systems may apply large enough Earth terminal to further reduce the pfd level needed from the space and to close link. Scenario (6) requires significant sidelobe attenuation from the spacecraft at the appropriate off-axis angle. Scenario (11) requires a less-interfering satellite tracking method to facilitate spectrum sharing (in transition zone) to protect especially GSO earth stations with smaller antennae apertures. Scenario (12) also requires sufficient angle for GSO arc avoidance in order to reduce the aggregated interference generated from the NGSO uplinks.

The Meo System Satellite System

Figure 21:
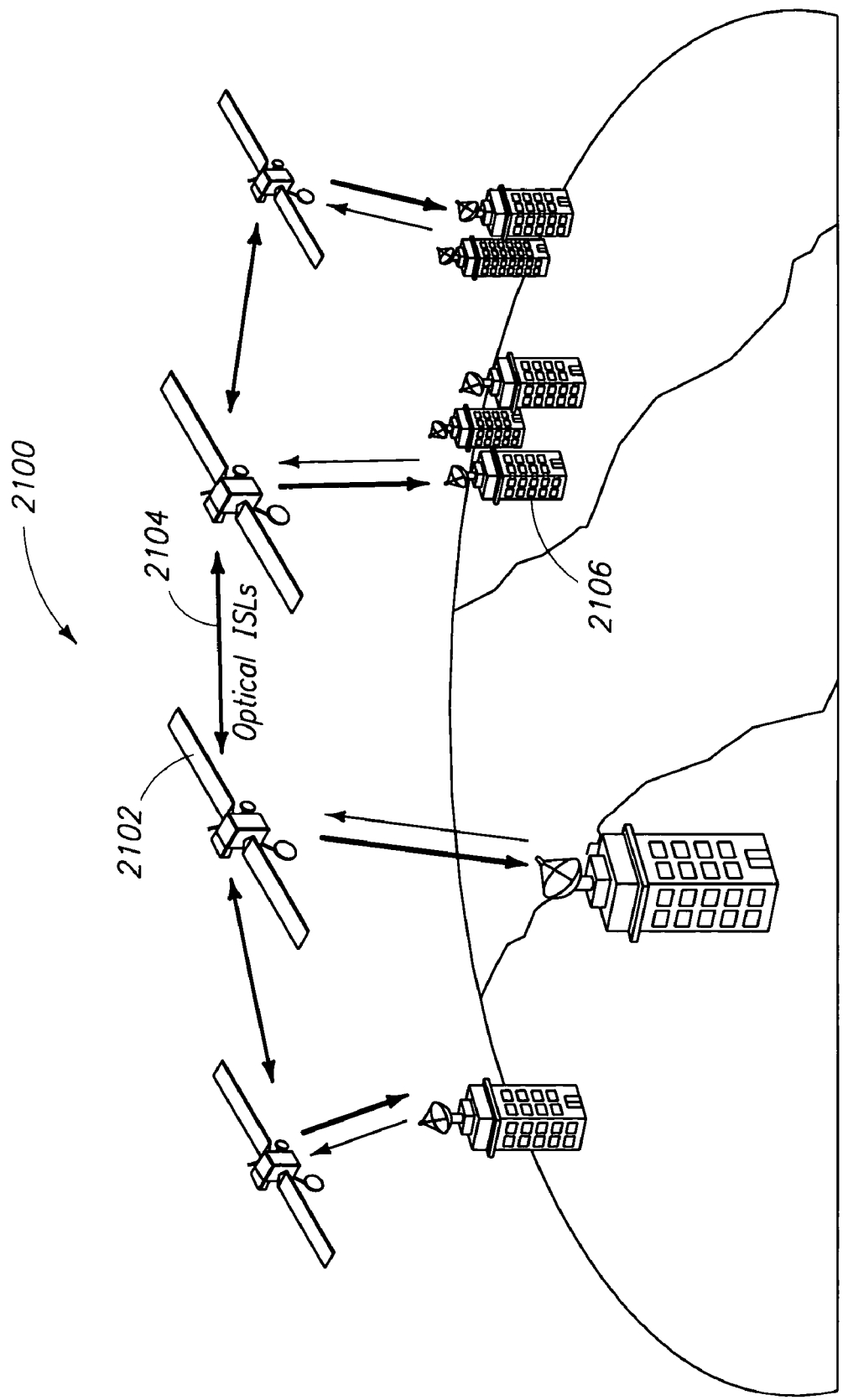
FIG. 21 is a diagram of the MEO SYSTEM.

FIG. 21 is a diagram of the MEO SYSTEM satellite communications system 2100. The MEO SYSTEM 2100 can be used in the alternative to the LEO SYSTEM satellite communications system 100, or may be used in conjunction with the LEO SYSTEM communications system 100 to provide increased worldwide service.

The MEO SYSTEM 2100 provides broadband communications services to customers within the United States and throughout the world and offers service at data rates from 1.54 MBPS (T1) up to 155 MBPS (OC-3). The MEO SYSTEM 2100 comprises a space segment, a ground segment, and a service segment. The space segment comprises a plurality of MEO SYSTEM satellites 2102 in a MEO orbit, which communicate with one another via a MEO SYSTEM intersatellite link (ISL) 2104.

The ground segment comprises a plurality of MEO SYSTEM user terminals 2106, which may be similar or identical in design to the LEO SYSTEM user terminals 114, system access nodes, and control centers, including one or more NOCs 124, and one or more SOCs 128, which facilitate TT&C control. Each NOC 124 works with the satellite onboard processors to control user access requests, and thus facilitates Internet connections. The NOCs 124 also monitor service availability and capacity, beam management, and handovers throughout the system. In one embodiment, the MEO SYSTEM user terminals 2106 are comprised of a family of MEO SYSTEM user terminals 2106 with antennae that range in size from a 1 m (40 in) to 2 m (79 in) diameter.

Spot beam coverage from any MEO SYSTEM satellites 2102 can be reconfigured in-orbit to respond to market demands. As with the LEO SYSTEM 100, the use of spot beams and dual polarization allows the Ku-band spectrum to be reused 25 times by each MEO SYSTEM satellite 2102. The system has been designed to facilitate frequency sharing with other systems, both NGSO and GSO. The MEO SYSTEM network 2100 provides users with a transparent connection to a wide variety of terrestrial networks including the Internet, corporate intranets, wide area networks (WANs), local area networks (LANs), and autonomous transfer mode (ATM) networks.

Frequency Plan

The MEO SYSTEM network 2100 supports both packet-switched and circuit-switched operation through switches disposed in the MEO SYSTEM satellites 2102. The on-board switch matrix provides connectivity from the uplink to the downlink beams and to the intersatellite links 2104 which will route packet-switched and circuit-switched data to proper destinations.

The NOC 124 works with the satellite onboard processors to control user access requests. In addition it monitors service availability and capacity, beam management, and handovers throughout the system.

Figure 22:
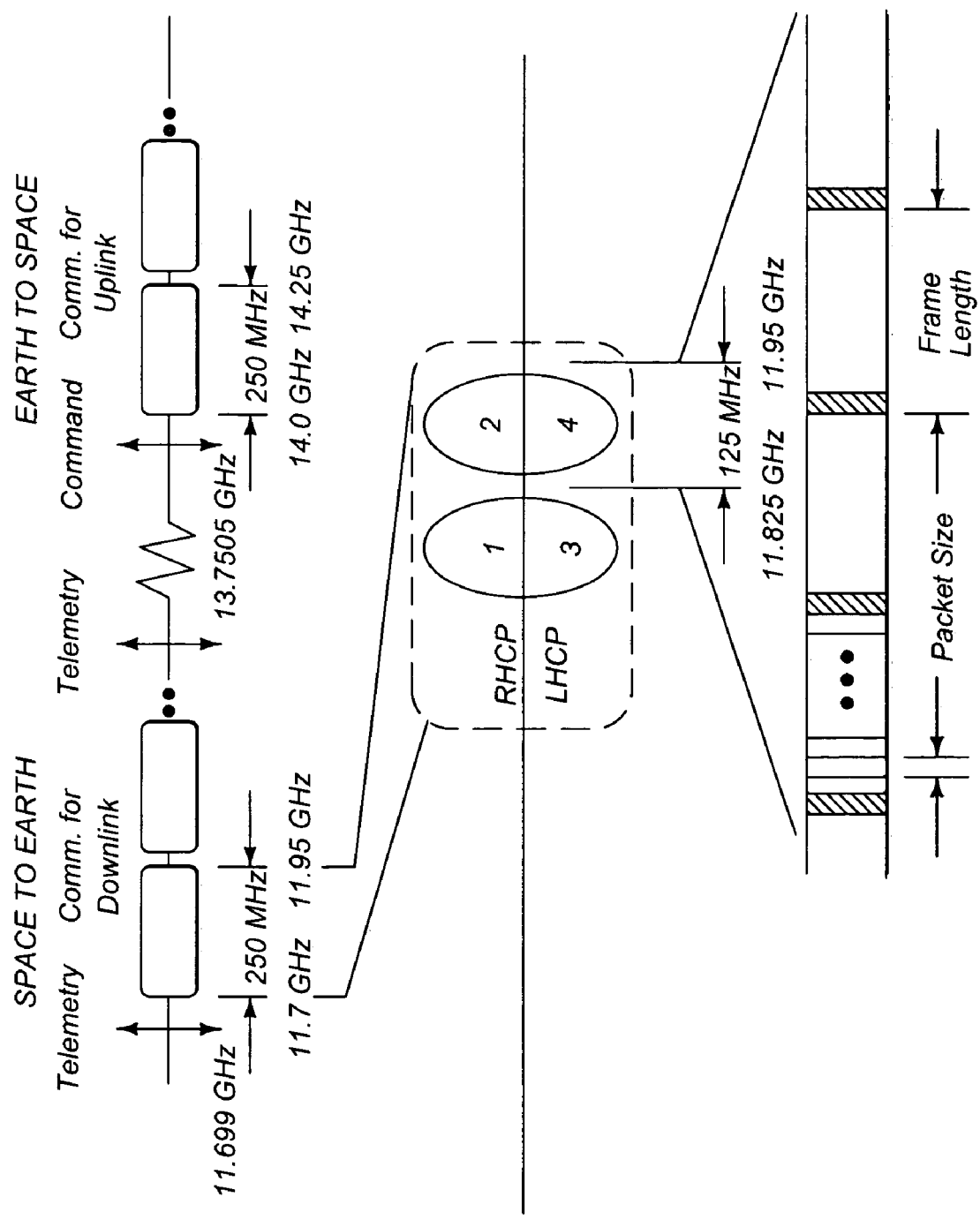
FIG. 22 is a diagram illustrating a frequency plan for one embodiment of the MEO SYSTEM 2100.

FIG. 22 is diagram presenting an illustrative frequency plan for the MEO SYSTEM. The spectrum is divided into multiple 250 MHz segments for uplink and downlink signals depending the available spectrum in each region. Each segment is then divided into two 125 MHz sub-segments and reused in each of two polarizations (right hand and left hand circular).

The design of the MEO SYSTEM satellite 2102 antenna system maximizes spatial isolation among beams with the same frequency and polarization. The design allows dense coverage of high demand areas because multiple 125 MHz band segments can be deployed to maximize service capacity in the same geographic area. One of several different beam laydown patterns can be chosen in a service area, depending on service requirements.

Like the LEO SYSTEM 100, MEO SYSTEM 2100 uses a combination of Frequency Division Multiple Access (FDMA) and Time Division Multiple Access (TDMA) to provide service at flexible data rates. A carrier bandwidth of 125 MHz will support 155 MBPS service to a 1.5 m terminal. Lower data rates can be supported through the combination of narrower FDMA carrier (<125 MHz) or TDMA slots. For example, 1.55 MBPS service can be supported by dividing a 125 MHz carrier into 100 time slots.

With small beamwidth footprints and dual polarization, the spectrum used in the MEO SYSTEM 2100 can potentially be reused 25 times per satellite. Approximately 250 beam positions and about 50 active beams are available per satellite 2102. Capacity can be flexibly allocated to a service area through the combination of changing beam positions and the length of illuminated period. Communication from the MEO SYSTEM user terminals 2106 and the MEO SYSTEM satellites 2102 is accomplished via Offset-Quadra-Phase Shift Keying (OQPSK) baseband modulation, with convolutional-concatenated, Reed-Solomon, error-correction coding.

Satellite Characteristics

Figure 23:
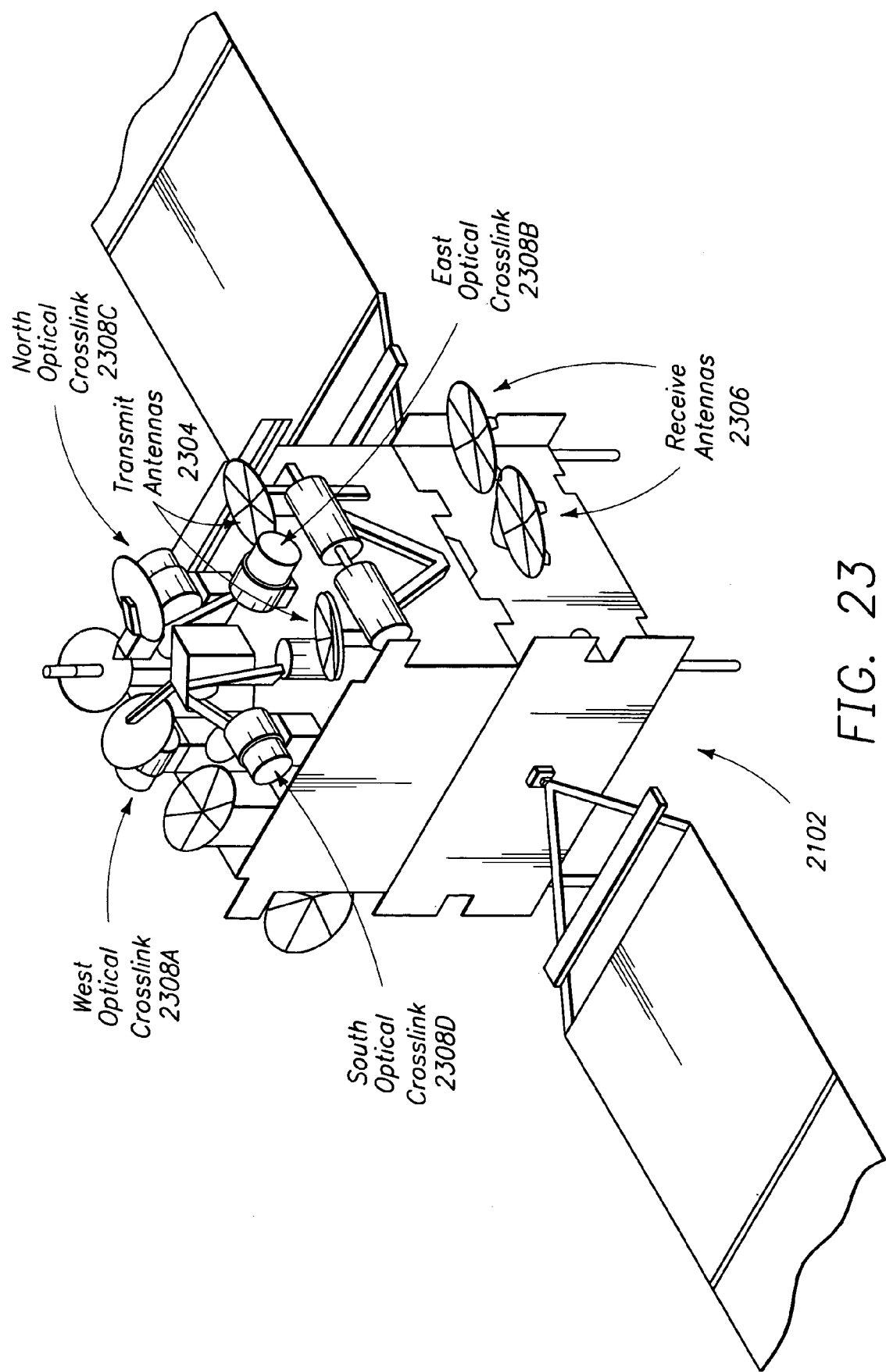
FIG. 23 is a diagram of one embodiment of a MEO SYSTEM satellite.

FIG. 23 is a diagram of one embodiment of an MEO SYSTEM satellite 2102. The MEO SYSTEM satellites 2102 are HE high-power, body-stabilized medium Earth orbit satellites. Satellite characteristics are described in Table VII below:

TABLE VII

| | |
|---|---|
| Satellite Bus | HE high power MEO satellite |
| Mission Life | 12 years |
| Stabilization | Body stabilized using reaction wheels |
| DC Power - End of Life | 9.1 kW |
| Eclipse Capability | 100% |
| Deployed Length | Approximately 33 m |
| Approximate Mass | 3000 kg with propellant |
| | 2600 kg without propellant |
| Ku-band Antennas | 4 Ku-band transmit reflector antennas |
| | 4 Ku-band receive reflector antennas |
| | Phased array antennas |

TABLE VII-continued

| | |
|---|---|
| T&C Antennas | 2 Ku-band transmit/receive bi-cones |
| | 2 Ku-band transmit/receive pipe antennas |
| Antenna Pointing Method | Earth sensor, sun sensor, and gyros |
| Number of Beam Positions | 250 beam positions (2.5° from MEO) |
| Number of Active Channels | 50 single polarization channels (beams) |
| Number of Command Carriers | 2 |
| Number of Telemetry Carriers | 2 |
| Number of Tracking Beacons | The telemetry signals also serve as tracking beacons |
| Number of Laser Carriers, ISL | 2 or more |
| Ku-Band Spectrum Reuse | Potentially 25 times |
| Antenna Pointing Accuracy | ±0.25 degrees N-S and E-W |
| Antenna Pointing Range | 17° from nadir circular field-of-view |
| Antenna Beamwidth | 2.5 degrees |

MEO SYSTEM 2100 provides broadband data communications at rates up to 155 MBPS. Circuits can be symmetrical or asymmetrical and simplex or duplex. Payload management and reconfiguration will be performed via MEO SYSTEM's TT&C subsystem operating in conjunction with the system's ground operations and control segment. The communication parameters for the MEO SYSTEM 2100 system is described in Table VII below:

TABLE VIII

| Parameter Description | Ku-Band Payload | Crosslink Payload |
|---|---|---|
| Modulation Format | OQPSK | Intensity, Wavelength Multiplexed |
| Coding Scheme | Convolutional Concatenated Reed Solomon | Convolutional Concatenated Reed Solomon |
| Target Bit Error Rate | $1 \times 10^{-9}$ | $1 \times 10^{-9}$ |
| Data Rate | E1/4, E1, 6 MBPS, 10 MBPS packet switched; up to 155 MBPS circuit switched | 3 GBPS |
| Total Bandwidth per Beam | 125 MHz | N/A |

The Ku-band subsystem will utilize one GHz of spectrum within 10.7–12.7 GHz (Region 2) and 10.70–12.75 GHz (Regions 1 and 3) for space-to-Earth transmissions and one GHz within 12.75–13.25 and 13.75–14.5 GHz for Earth-to-space transmissions. The precise bands to be used are determined in accordance with spectrum availability in each area that the system serves. The 1000 MHz is divided into eight 125 MHz subbands. Each subband carries maximum OC3 rate data (155 MBPS), which is then broken into a plurality (for example, 100) T1 (1.54 MBPS) carriers through TDMA. A variety of service-type combinations within the 1000 MHz are possible, and can be adapted to meet specific user needs.

The antenna subsystem includes a plurality of feed reflector antennas (as shown) or direct radiating arrays, such as the MEO SYSTEM receive antennae 2306 and the MEO SYSTEM transmit antennae 2304. Each antenna utilizes dual polarization with 20 dB of cross-polarization isolation, and is capable of providing approximately 250 spot beam positions. Fifty (50) spot beams are provided per MEO SYSTEM satellite 2102, each spot beam utilizing 125 MHz of transmit and receive frequency spectrum. An MEO SYSTEM satellite 2102 processor can also switch multiple subbands to a single beam if the demand is high in a specific beam. As each satellite passes over a service area, it may direct its beams (array version) or switch its beams (reflector antenna version) at specific locations.

Figure 24:
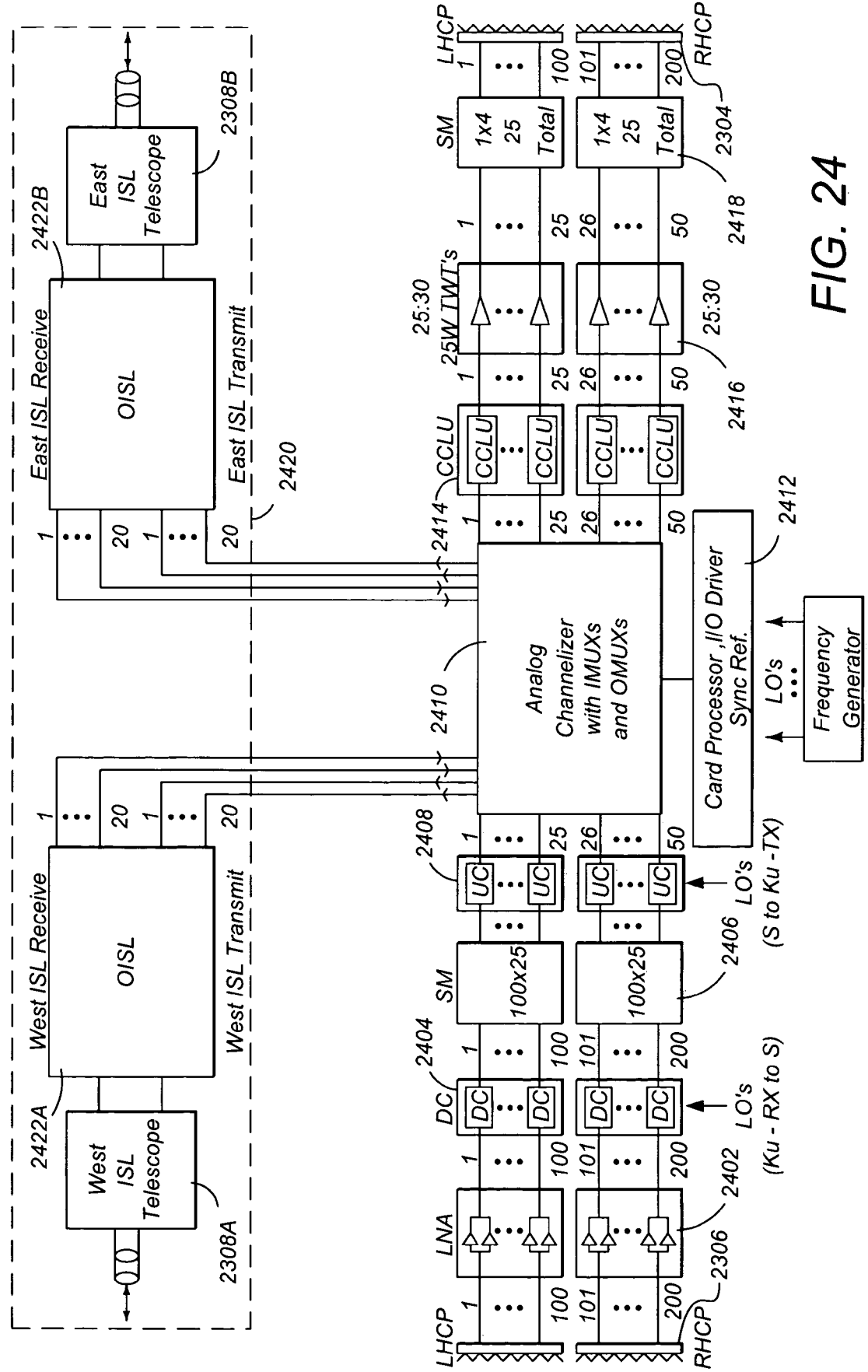
FIG. 24 is a block diagram showing one embodiment of the communications payload for the MEO SYSTEM satellite.

FIG. 24 is a block diagram showing one embodiment of the communications payload for the MEO SYSTEM satellite 2102. Signals arriving at each of the receive antennas 2306 are amplified by MEO SYSTEM LNAs 2402 attached to the antennae feed elements. Following the MEO SYSTEM LNAs 2402, the signal from each feed element is down converted from the Ku band to the S band by the MEO SYSTEM downconverter 2404, provided to the switch matrix 2406, and up converted from the S band to the Ku band by the MEO SYSTEM upconverter 2408. Then, the signals are directed to an channelizer 2410. The analog MEO SYSTEM channelizer 2410 directs the signals from the upconverter 2408 according to commands received from the command processor 2412.

Following the MEO SYSTEM channelizer 2410, the signals from each beam are downconverted to the 11 GHz band by the MEO SYSTEM downconverter 2414, and then amplified by MEO SYSTEM traveling wave tube amplifiers (TWTAs) 2416, and then sent to the high power switch matrices (SM) 2418. The output switch matrix 2418 selects the necessary feed elements in the transmitting reflector antennas to generate the required downlink beam. Information derived from the optical crosslinks 2104 also are directed through the MEO SYSTEM switch matrices 2418. Signals present at the output of the switches that are intended for a downlink beam on the same satellite are recombined and transmitted via transmit antennas 2304.

The channelizer 2410 directs signals intended to be delivered to another MEO SYSTEM satellite 2102 are routed to the intersatellite link subsystem 2420. The intersatellite link subsystem 2420 comprises a transceiver units 2422A and 2422B coupled to the channelizer 2410. Each transceiver unit 2422A and 2422B accepts and processes data intended for transmission via the intersatellite link 2104, and provides this processed data to a telescope (2308A and 2308B, respectively), which optically transmit the data to another MEO SYSTEM satellite 2102. Similarly, each telescope 2308A and 2308B sense optically received information from the transceiver units 2422a and 2422B, respectively, and supply the information to the channelizer 2410.

The intersatellite link subsystem 2420 implements two optical intersatellite link (ISL) terminals, which are provided for inter operation with other MEO SYSTEM satellites 2102. Signals from these ISL terminals are interfaced with both the TDMA OC-3 circuit-switched payload and the packet-switched processor payload as previously described.

Any lower rate data signals previously separated by the input multiplexers at the repeater input are sent to a digital switch processor where the signal band is demodulated into individual digital data packets. The packets are directed to the appropriate downlink beam using an MEO SYSTEM router, which also has input and output signal interfaces to the optical crosslinks. The packets are reassembled into continuous data streams, and those destined for Ku-band spot downlinks are modulated onto high capacity OQPSK carriers for recombination with the OC-3 carriers at the output multiplexers.

Antennae

The MEO SYSTEM satellite 2102 includes four transmit antennae 2304, each having multiple input feeds. The transmit 2304 antennae 2306 provide a total of 50 beams (25 in each polarization). Each of the four transmit reflector antennae 2304 are nominally about 0.75 m in aperture, and are mounted on the east and west faces of the MEO SYSTEM satellite 2102 body. The transmit antennae 2304 produce a spot beam which has a diameter of 2.5 degrees. The composite of the spot beams forms a beam pattern that is fixed relative to the spacecraft, resulting in a beam pattern on the earth surface that moves as the spacecraft moves.

The MEO SYSTEM satellite 2102 also includes four receive reflector antennae 2306 of approximately 0.64 m aperture. Each of the receive reflector antennae 2306 with multiple feeds, which provide a total of 50 beams (25 in each polarization).

The MEO SYSTEM satellite 2102 also includes a telemetry and command antenna system consisting of two horn antennas providing TT&C services. The telemetry signals also serve as tracking beacons for the ground communication antennas. The forward antenna is a ±22.5° horn used for normal on-orbit operation. The aft antenna is a ±70° horn used for emergency operations.

The MEO SYSTEM satellite 2102 also comprises at least two optical ISL terminals, providing east and west ISL beams for equatorial plane satellites. As many as 4 ISL assemblies that provide further connection for inclined orbit satellites. The four receive reflector antennae 2306 and the ISL terminals are be mounted on the earth facing side.

TDMA Switch

The analog channelizer 2410 implements satellite-switched to route uplink users to downlink users for the OC-3 carriers. The TDMA switch routes each TDM channel at a particular time in a particular uplink beam to its assigned downlink beam. The TDMA switch time gates uplink traffic to the appropriate downlink. Synchronization information is transmitted to all user ground terminals to synchronize their transmission, reception, and demodulation equipment to the satellite TDMA switch.

Digital Signal Processor

A digital signal processor (DSP) subsystem provides interconnectivity for the packet-switched portion of the communications payload. The uplink frequency band segment for each beam containing the packetized data at 10 MBPS and below is sent to the demodulator portion of the DSP, where the signals are all demodulated and the error correction coding removed. The individual data packets are then sent to the router, which directs them to the appropriate downlink data stream based on the address information contained in the packet header. The resulting data streams for each downlink beam are then buffered and either remodulated onto high speed 155 MBPS TDM OQPSK carriers for transmission by Ku-band spot beam downlinks or sent directly to the optical intersatellite links.

Optical Intersatellite Links (ISLs)

ISLs 2104 are used to communicate information between satellites to provide globally interconnected services through connections with other HE satellites. Selected outputs of the MEO SYSTEM 2102 on-board processor will be routed to the laser intersatellite payload where the data will be processed to provide 3.5 GBPS maximum intersatellite link capability. The 1.55 μm wavelength is chosen to use commercial equipment appropriately modified for a space environment.

Space Segment Bus Subsystems

The MEO SYSTEM satellites 2102 operate in both equatorial plane and inclined orbits in MEO. Antennae are oriented to the nadir and the solar cell arrays are oriented toward the sun. This satellite attitude reference is referred to as sun-nadir steering. Sun-nadir steering maximizes power collection and heat rejection for satellites in inclined orbits.

The satellite structure provides a stable platform throughout the mission. It has been optimized so that it efficiently distributes launch loads and is compatible with launch vehicles supporting 4 m or larger payload spacing.

Tracking, Telemetry, and Control Subsystem

The tracking, telemetry, and control subsystem (TT&C) provides antennas, receivers, transmitters, and digital equipment to support spacecraft commanding, monitoring, and ranging during all phases of the mission and operation. The subsystem receives and demodulates the command uplink and relays the command data to the central telemetry and command unit (CTCU) for processing. It modulates the telemetry subcarrier from the CTCU onto the RF downlink carrier. The subsystem also demodulates ranging tones from the uplink carrier and remodulates the tones onto the downlink carrier to allow accurate ground determination of spacecraft. The on-orbit tracking, telemetry, and control subsystem will be operated in Ku-band. Telemetry signals will have the same circular polarization as the communications downlink signals, and command signals will have the same circular polarization as the communications uplink signals.

Attitude Control

The spacecraft attitude control subsystem includes the attitude sensors, attitude control actuators, and the associated electronic processing. The spacecraft control processor (SCP) processes sensor input signals and controls the attitude actuators and processes orbit data during the various mission phases. The attitude control subsystem (ACS) is a zero-momentum bias type with sun-nadir steering to optimize power and thermal control performance. The actuators include four reaction wheels for control torque, thrusters for acquisition and station-keeping maneuvers, and solar wing drives for pointing the solar wings.

Propulsion

The liquid propulsion subsystem performs satellite velocity and attitude control maneuvers in response to onboard and ground commands. This system consists of two fully redundant subsystems. Thrusters are used to provide spin and/or attitude control during injection error correction, orbit maintenance, and maneuvers including station-keeping, phasing, and end-of-life deorbit and on-orbit operations.

Electric Power

The electric power subsystem provides electrical power for all of the subsystems on the spacecraft. The spacecraft uses a regulated bus and collects its energy through two solar wings. A battery charged by the solar array supplies full power to the spacecraft during solar eclipses. The power electronics include an integrated power controller (IPC). Centralized power fusing, switching, and bus current telemetry are provided by the bus power distribution units and payload power distribution units.

Thermal Control

The thermal control subsystem provides a controlled thermal environment throughout the mission. The radiator panels reject internally dissipated heat to space and are "isothermalized" with embedded heat pipes. Heaters are used to limit the lower temperature extremes of the satellite's equipment.

Satellite Constellation

The space segment consists of total of 22 substantially identical MEO SYSTEM satellites 2102, eight of which are disposed in an equatorial-plane and 14 disposed in inclined orbits. All MEO SYSTEM satellites 2102 operate at 15,000 km altitude, which corresponds to a 8.6-hour orbital period. An appropriate number of in-orbit and on-the-ground spares will be included for enhanced system reliability.

For equatorial orbit, satellites 2102 operate in one non-inclined circular plane. In order to share spectrum with GSO satellites, the equatorial satellites will not cover the equatorial region. The inclined orbit segment consists of 14 MEO satellites 2102 which are disposed in two circular planes of seven satellites, with each plane inclined at approximately 45 degrees. The MEO constellation is uniform with respect to longitude and symmetric about the equator.

Figure 25:
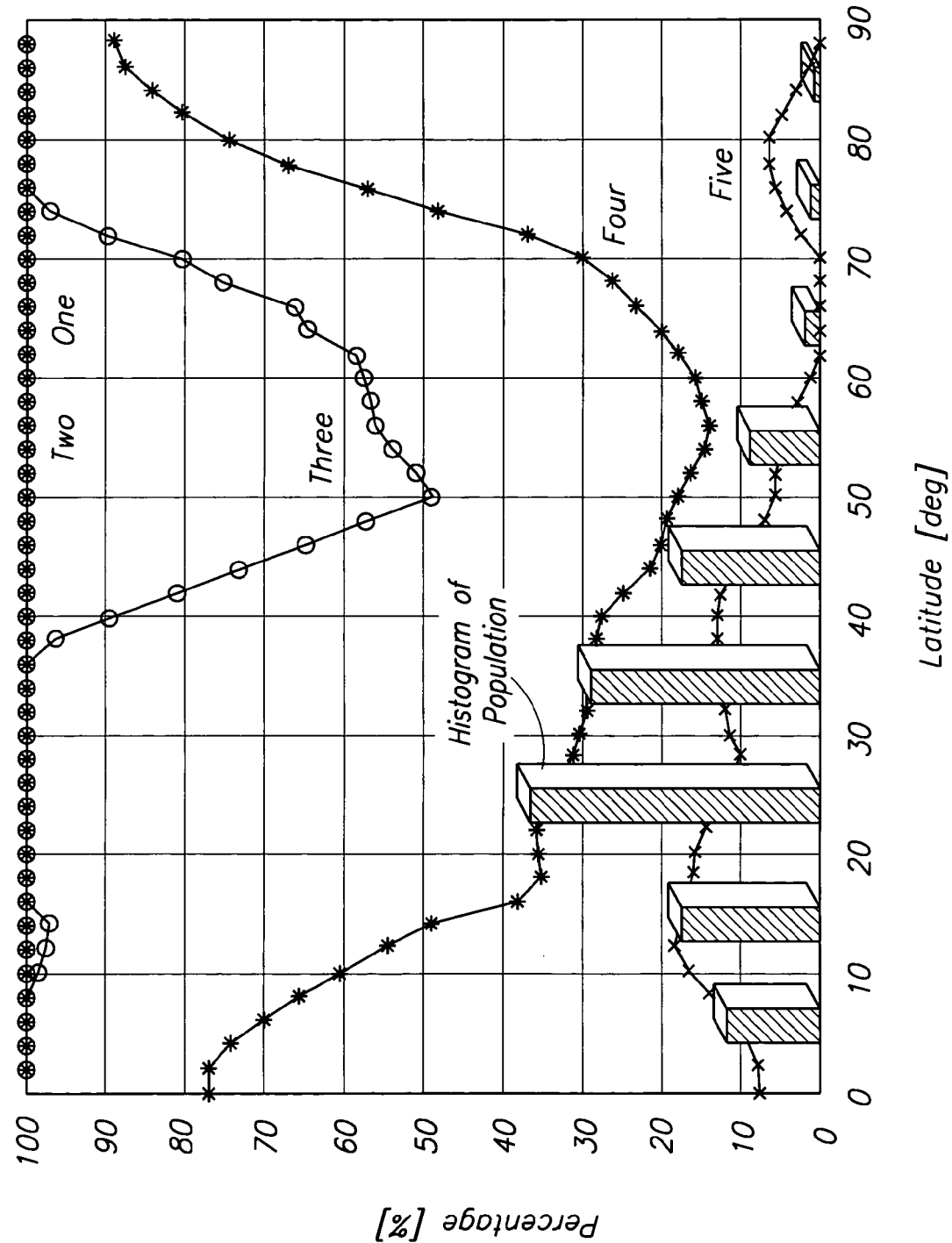
FIG. 25 is a diagram showing the number of visible and non-GSO interfering satellites in the MEO SYSTEM constellation as a function of latitude.

FIG. 25 is a diagram showing the number of visible and non-GSO interfering satellites in the MEO SYSTEM constellation as a function of latitude. These results, which were derived with a minimum elevation angle of 10 degrees and minimal GSO arc separation, are also compared to a histogram of world population by latitude. Additional non-operational zones depend on NGSO/GSO bandwidth sharing concerns. Together, the MEO SYSTEM satellites 2102 provide complete coverage up to 90° latitude with at least two visible satellites, by which satellite diversity can be applied to facilitate spectrum sharing.

Ground Segment

The MEO SYSTEM system 2100 utilizes the NOC 124 and the SOC 128 for managing user access to the system and payload operations.

User Equipment

To achieve availabilities of 99.5% to 99.7%, multiple classes of terminals are deployed, depending on earth station location, service category, and other system parameters. In one embodiment, the ground terminals 2106 include 1 earth station classes: MEO SYSTEM Small and MEO SYSTEM Large terminals. The MEO SYSTEM small terminals provide a maximum data rate of 45 MBPS, and the MEO SYSTEM large terminals provide a maximum data rate of 155 MBPS. Table IX below presents a summary of illustrative small terminal characteristics, and Table X presents a summary of large terminal characteristics.

TABLE IX

| | |
|---|---|
| RF Transmit Frequencies | 12.75–13.25 GHz and 13.75–14.5 GHz |
| RF Receive Frequencies | 10.7–12.7 GHz or 10.7–12.75 GHz |
| Antenna Aperture | 100 cm (39 in) |
| Terminal Transmit Power | 3.5 W @ 1 dB backoff |
| Terminal Scan | 2D Tracking |
| Receiver Noise Figure | 1.5 dB |
| Data Rate | T1 (1.54 MBPS)–T3 (45 MBPS) |

TABLE X

| | |
|---|---|
| RF Transmit Frequencies | 12.75–13.25 GHz and 13.75–14.5 GHz |
| RF Receive Frequencies | 10.7–12.7 GHz or 10.7–12.75 GHz |
| Antenna Aperture | 200 cm (79 in) |
| Terminal Transmit Power | 3 W @ 1 dB backoff |
| Terminal Scan | 2D Tracking |
| Receiver Noise Figure | 1.5 dB |
| Data Rate | T3 (45 MBPS)–OC3 (155 MBPS) |

Interference with Non-MEO SYSTEM Satellites

Interference can occur when the desired C/I ratio drops below a required protection threshold. To minimize interference to and from other satellite systems, the MEO SYSTEM 2100, like the LEO SYSTEM, uses spectrum sharing techniques that include satellite diversity (the availability and use of multiple satellites by handover switching and other augmentation) and narrow beamwidth antennas. Additionally, the MEO SYSTEM satellite 2102 constellation parameters are selected and designed, to minimize potential interference to GSO services.

Figure 26A:
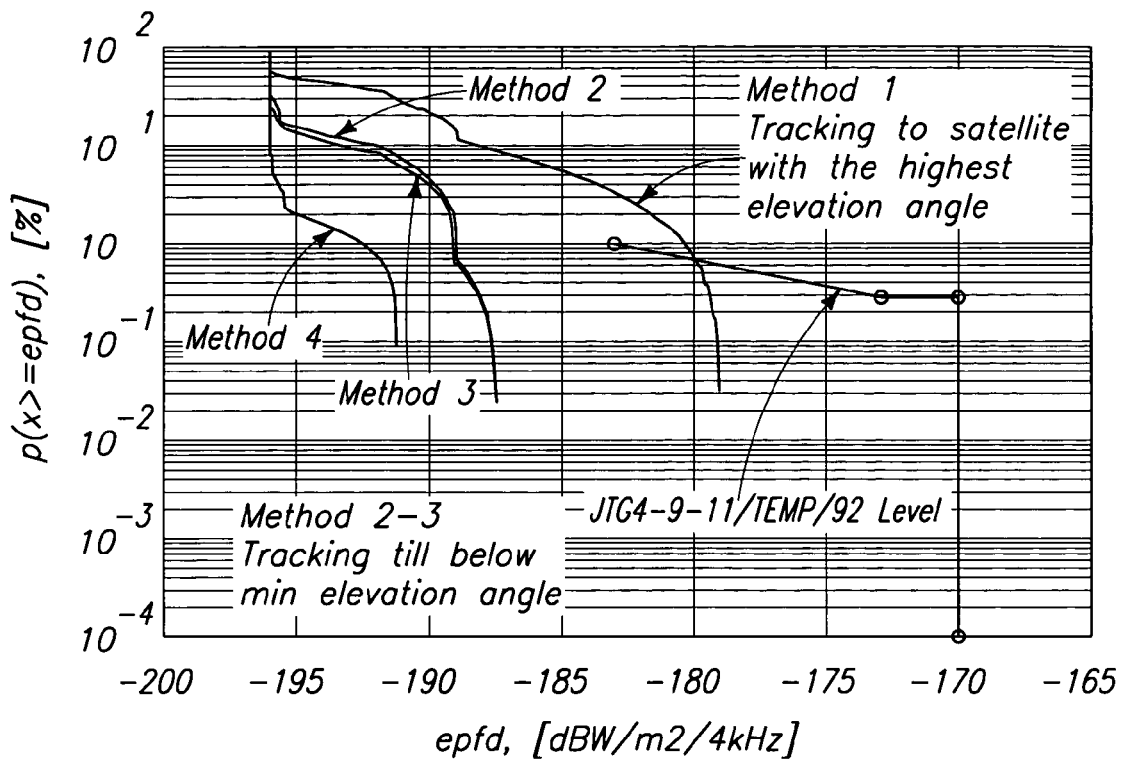
FIGS. 26A–26D are diagrams showing the predicted EPFD for the MEO SYSTEM 2100 using a GSO 10 degree protection zone and additional tracking methods.
Figure 26B:
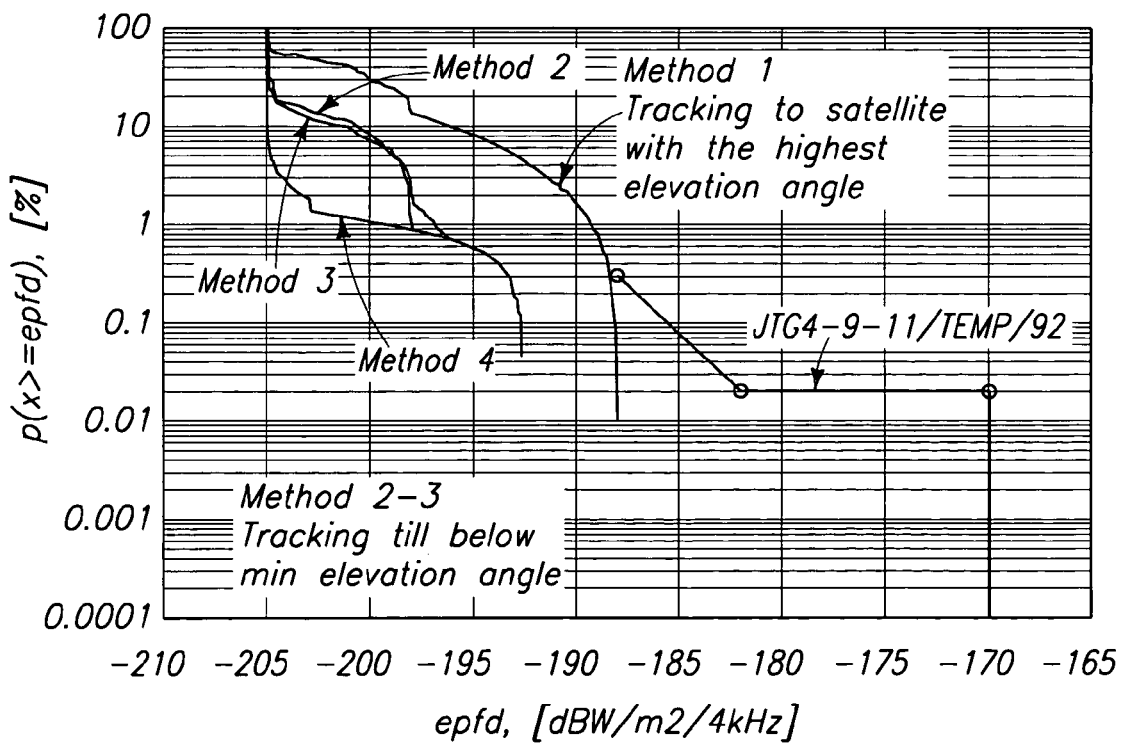
Figure 26C:
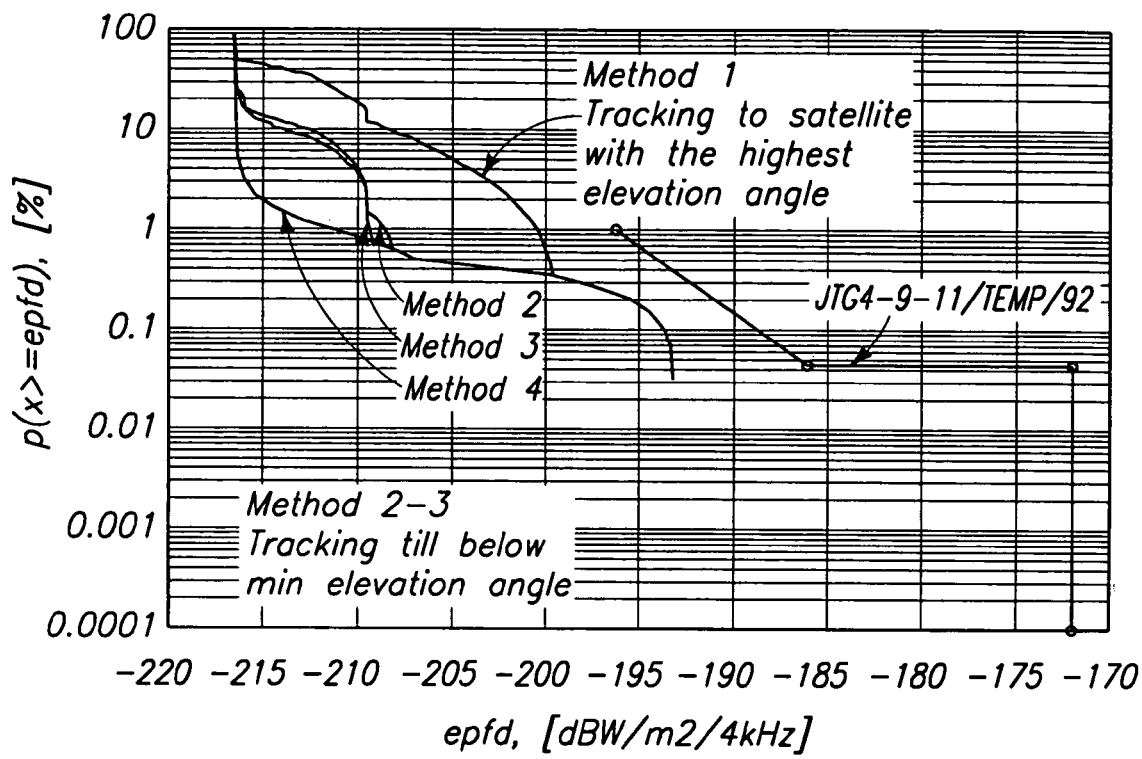
Figure 26D:
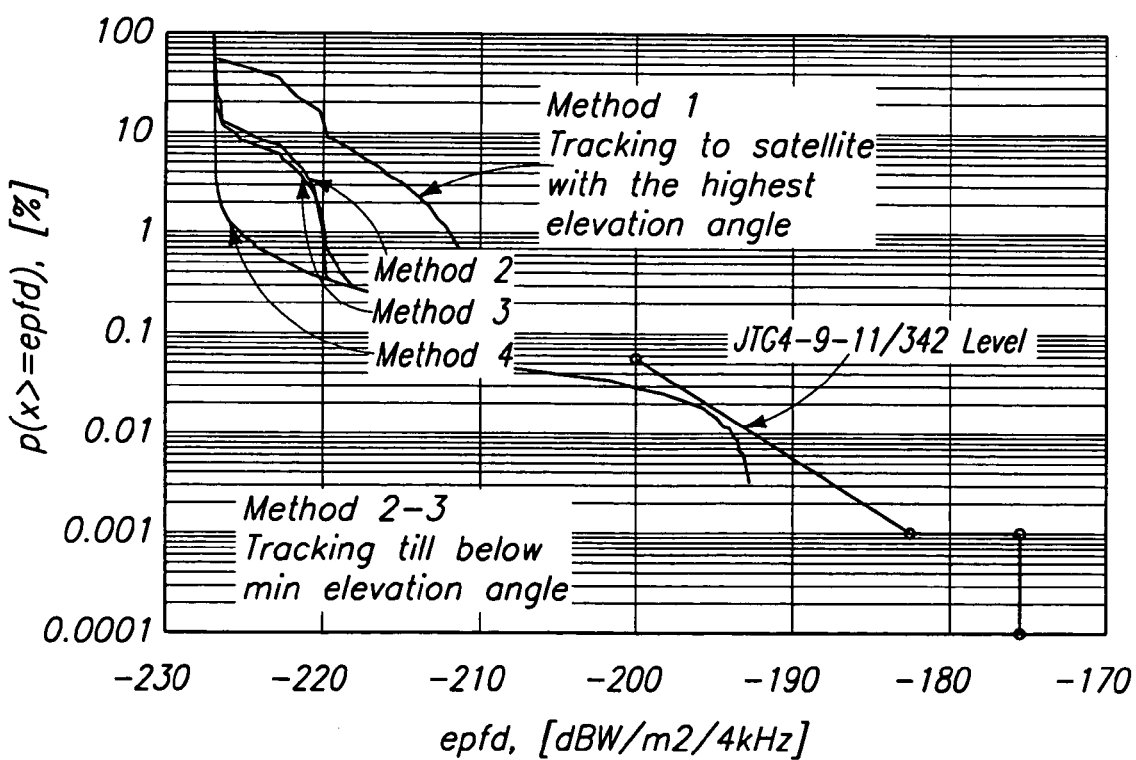

FIGS. 26A–26B are diagrams showing the predicted EPFD for the MEO SYSTEM 2100 the tracking methods outlined in Table VI, and the GSO 10 degree protection zone. FIG. 26A shows the predicted statistical EPFD for the MEO SYSTEM 2100 using a 0.6 meter GSO ground station terminal 1208 antenna. FIG. 26B shows the predicted EPFD for the MEO SYSTEM 2100 using a 1.2 meter GSO terminal 1208 antenna. FIGS. 26C–26D show the predicted EPFD for the MEO SYSTEM 2100 using a 3.0 meter and a 10.0 meter antenna, respectively.

In summary, the present invention describes a method and apparatus for mitigating communications interference between satellite communications systems in different orbits.

One aspect of the invention is embodied in method for defining the communications satellite system. The method comprises the steps of identifying a plurality of communication interference scenarios; categorizing an interference requirement specifying a maximum interfering signal strength statistic at each of the second satellites according to a frequency of occurrence; identifying at least one interference mitigation strategy for each scenario and each category of interference requirement; determining the effectiveness of each identified interference mitigation strategy in mitigating interference for each of the scenarios and categories of interference requirement; and selecting at least one of the identified mitigation means for the first satellite communication system according to the determined effectiveness of the interference mitigation strategy.

Another aspect of the invention is embodied in a method for mitigating communication interference between a first satellite communicating with a first ground station and a second satellite, wherein the second satellite is one of a plurality of satellites in a second satellite constellation. The method comprises the steps of evaluating a geometrical relationship between a second ground station and the satellites in the second satellite constellation, and directing communications between the second ground station and the second satellite according to the evaluated geometrical relationship.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for providing broadband access to a communication service to user terminals, comprising;
   a network of satellites, each satellite having;
      at least one communication antenna for generating at least one beam cluster including a plurality of proximally disposed steerable communication beams;
      a flexible channelizer for dynamically directing the steerable communication beams according to user terminal communication service demands; and
   a plurality of gateway nodes, each gateway node associated with the user terminals serviced by the beam cluster, each gateway node for forwarding messages received from at least one of the user terminals serviced by the beam cluster via the network of satellites to the communication service, and for forwarding messages received from the communication service to at least one of the user terminals serviced by the beam cluster via the network of satellites.

2. The system of claim 1, wherein the network of satellites are in non-geostationary orbits.

3. The system of claim 2, wherein the network of satellites includes a low earth orbit (LEO) system of satellites and a mid earth orbit (MEO) system of satellites.

4. The system of claim 1, wherein the beam cluster includes multiple overlapping beams to provide service at flexible data rates.

5. The system of claim 4, wherein the steerable communications beams further use frequency division multiple access (FDMA) and time division multiple access (TDMA) to provide service at flexible data rates.

* * * * *